(12) United States Patent
Omura

(10) Patent No.: US 9,044,632 B2
(45) Date of Patent: Jun. 2, 2015

(54) INFORMATION PROCESSING APPARATUS, INFORMATION PROCESSING METHOD AND RECORDING MEDIUM STORING PROGRAM

(75) Inventor: Kazuhiro Omura, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 367 days.

(21) Appl. No.: 13/097,842

(22) Filed: Apr. 29, 2011

(65) Prior Publication Data

US 2011/0206354 A1 Aug. 25, 2011

Related U.S. Application Data

(63) Continuation-in-part of application No. PCT/JP2009/005733, filed on Oct. 29, 2009.

(30) Foreign Application Priority Data

Oct. 31, 2008 (JP) ................................ 2008-281007

(51) Int. Cl.
*H04N 5/783* (2006.01)
*A63B 24/00* (2006.01)
(Continued)

(52) U.S. Cl.
CPC ......... *A63B 24/0006* (2013.01); *A63B 24/0075* (2013.01); *A63B 71/0622* (2013.01);
(Continued)

(58) Field of Classification Search
CPC .................................................. A63B 24/0006
USPC ......................................................... 386/343
See application file for complete search history.

(56) References Cited

U.S. PATENT DOCUMENTS 6,448,485 B1 * 9/2002 Barile ............................. 84/609
6,556,775 B1 * 4/2003 Shimada ....................... 386/241
(Continued)

FOREIGN PATENT DOCUMENTS

JP 2001-306071 11/2001
JP 2002-140080 5/2002
(Continued)

OTHER PUBLICATIONS

International Search Report dated Dec. 15, 2009 issued in PCT JP2009/005733.
(Continued)

*Primary Examiner* — William C Vaughn, Jr.
*Assistant Examiner* — Luis Perez Fuentes
(74) *Attorney, Agent, or Firm* — Scully, Scott, Murphy & Presser, PC

(57) ABSTRACT

An information processing apparatus includes: a first obtaining portion configured to obtain plural pieces of motion information representing type of motion; a second obtaining portion configured to obtain motion video information including a video corresponding to the motion information obtained by the first obtaining portion; a motion list generating portion configured to generate a motion list which includes at least one piece of the motion information among the plural pieces of motion information; a motion speed setting portion configured to set motion speed at which motion of the motion information included in the motion list is performed; a third obtaining portion configured to obtain a music; a video controller configured to output the motion video information corresponding to the motion information in the motion list; and a music controller configured to output the obtained music according to the motion speed set for the motion information in response to outputting the motion video information by the video controller.

8 Claims, 30 Drawing Sheets

(51) Int. Cl.
*A63B 71/06* (2006.01)
*G10H 1/00* (2006.01)

(52) U.S. Cl.
CPC ..... *A63B71/0686* (2013.01); *A63B 2071/0625* (2013.01); *A63B 2071/0647* (2013.01); *A63B 2220/05* (2013.01); *A63B 2220/806* (2013.01); *A63B 2220/89* (2013.01); *A63B 2225/20* (2013.01); *A63B 2225/50* (2013.01); *G10H 1/0066* (2013.01); *G10H 2220/201* (2013.01); *G10H 2240/131* (2013.01)

(56) References Cited

U.S. PATENT DOCUMENTS

| | | | | |
|---|---|---|---|---|
| 6,805,656 | B2* | 10/2004 | Ogawa | 482/8 |
| 6,808,473 | B2* | 10/2004 | Hisano et al. | 482/8 |
| 7,402,743 | B2* | 7/2008 | Clark et al. | 84/615 |
| 7,825,319 | B2* | 11/2010 | Turner | 84/612 |
| 8,000,822 | B2* | 8/2011 | Shirai et al. | 700/94 |
| 8,212,136 | B2* | 7/2012 | Shirai et al. | 84/612 |
| 2002/0085833 | A1* | 7/2002 | Miyauchi | 386/96 |
| 2007/0027000 | A1 | 2/2007 | Shirai et al. | |
| 2007/0060446 | A1 | 3/2007 | Asukai et al. | |
| 2007/0209499 | A1 | 9/2007 | Kotani | |
| 2007/0221661 | A1 | 9/2007 | Nagasako | |
| 2008/0103022 | A1* | 5/2008 | Dvorak et al. | 482/3 |
| 2010/0040349 | A1* | 2/2010 | Landy | 386/96 |

FOREIGN PATENT DOCUMENTS

| | | |
|---|---|---|
| JP | 2005-316458 | 11/2005 |
| JP | 2007-7100 | 1/2007 |
| JP | 2007-33844 | 2/2007 |
| JP | 2007-075172 A | 3/2007 |
| JP | 2007-164932 | 6/2007 |
| JP | 2007-289515 | 11/2007 |
| JP | 2008-161552 A | 7/2008 |

OTHER PUBLICATIONS

Notification of Reasons for Refusal dated Apr. 2, 2013 received from related Japanese Patent Application No. 2008-281007, together with an English-language translation.

Decision of Refusal dated Jul. 2, 2013 received from related Japanese Patent Application No. 2008-281007, together with an English-language translation.

Notification of Reasons for Refusal dated Aug. 26, 2014 received in related Japanese Application No. 2013-203700, together with an English language translation.

* cited by examiner

Fig.4

| MOTION INFORMATION |
|---|
| ARM CURL |
| SQUAT |
| MARCH |
| PUSH UP |
| ⋮ |
| KNEE UP |
| SIDE STEP |
| ⋮ |
| FRONT LUNGE |
| BACK LUNGE |

Fig.5

| MOTION INFORMATION | MOTION VIDEO INFORMATION |
|---|---|
| ARM CURL | ARM CURL VIDEO |
| SQUAT | SQUAT VIDEO |
| MARCH | MARCH VIDEO |
| PUSH UP | PUSH UP VIDEO |
| ... | ... |
| KNEE UP | KNEE UP VIDEO |
| SIDE STEP | SIDE STEP VIDEO |
| ... | ... |
| FRONT LUNGE | FRONT LUNGE VIDEO |
| BACK LUNGE | BACK LUNGE VIDEO |

Fig.7

|  |  | X | Y | Z |
|---|---|---|---|---|
| P1 | HEAD | 15 | 10 | 30 |
| P2 | NECK | 15 | 10 | 25 |
| P3 | CHEST | 15 | 10 | 20 |
| P4 | LEFT SHOULDER | 20 | 10 | 15 |
| P5 | LEFT ELBOW | 25 | 10 | 15 |
| P6 | LEFT HAND | 30 | 10 | 12 |
| P7 | RIGHT SHOULDER | 10 | 10 | 15 |
| P8 | RIGHT ELBOW | 5 | 10 | 15 |
| P9 | RIGHT HAND | 0 | 10 | 12 |
| P10 | PIT OF STOMACH | 15 | 10 | 12 |
| P11 | LOWER BACK | 15 | 10 | 10 |
| P12 | LEFT KNEE | 22 | 10 | 5 |
| P13 | LEFT HEEL | 22 | 10 | 0 |
| P14 | LEFT TOE | 22 | 10 | 0 |
| P15 | RIGHT KNEE | 8 | 10 | 0 |
| P16 | RIGHT HEEL | 8 | 10 | 0 |
| P17 | RIGHT TOE | 8 | 10 | 0 |

Fig.10

| MUSIC INFORMATION |
|---|
| AA |
| BB |
| CC |
| DD |
| ⋮ |
| MM |
| NN |
| ⋮ |
| TT |
| SS |

Fig.11

| MUSIC INFORMATION | MUSIC PERFORMANCE INFORMATION |
|---|---|
| AA | AA PERFORMANCE.midi |
| BB | BB PERFORMANCE.midi |
| CC | CC PERFORMANCE.midi |
| DD | DD PERFORMANCE.midi |
| ... | ... |
| MM | MM PERFORMANCE.midi |
| NN | NN PERFORMANCE.midi |
| ... | ... |
| TT | TT PERFORMANCE.midi |
| SS | SS PERFORMANCE.midi |

Fig.13

| EXERCISE NAME | MOTION NUMBER | MOTION TEMPO | REPEAT TIME | MOTION INFORMATION |
|---|---|---|---|---|
| EXERCISE A | 1 | 120 | 8 | SQUAT |
| | 2 | 80 | 6 | KNEE UP |
| | 3 | 90 | 12 | BACK LUNGE |
| | 4 | 90 | 12 | FRONT LUNGE |

Fig. 14

| EXERCISE NAME | MOTION NUMBER | MOTION TEMPO | REPEAT TIME | MOTION INFORMATION | MUSIC INFORMATION |
|---|---|---|---|---|---|
| EXERCISE A | 1 | 120 | 8 | SQUAT | TT |
| | 2 | 80 | 6 | KNEE UP | MM |
| | 3 | 90 | 12 | BACK LUNGE | CC |
| | 4 | 90 | 12 | FRONT LUNGE | AA |

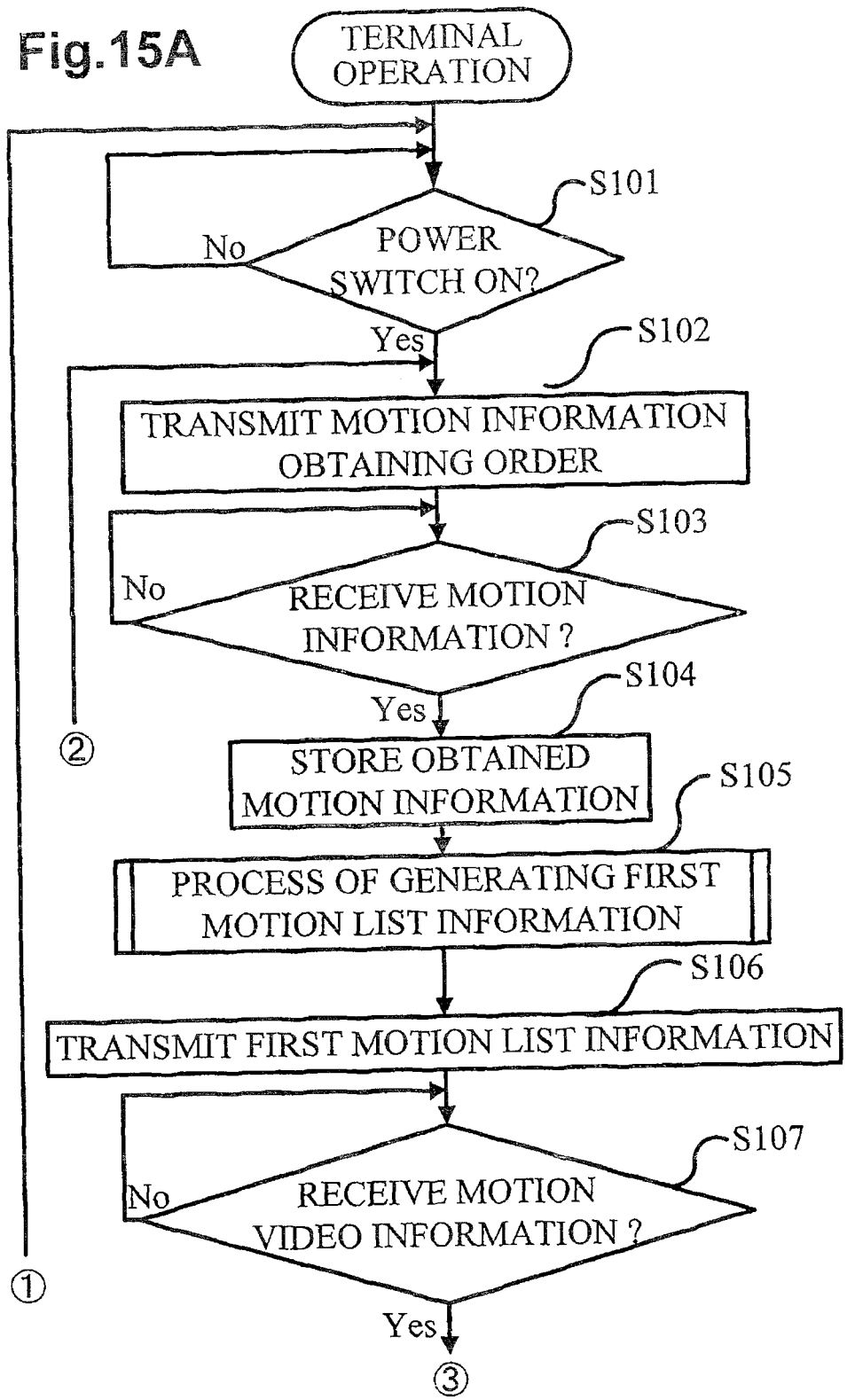

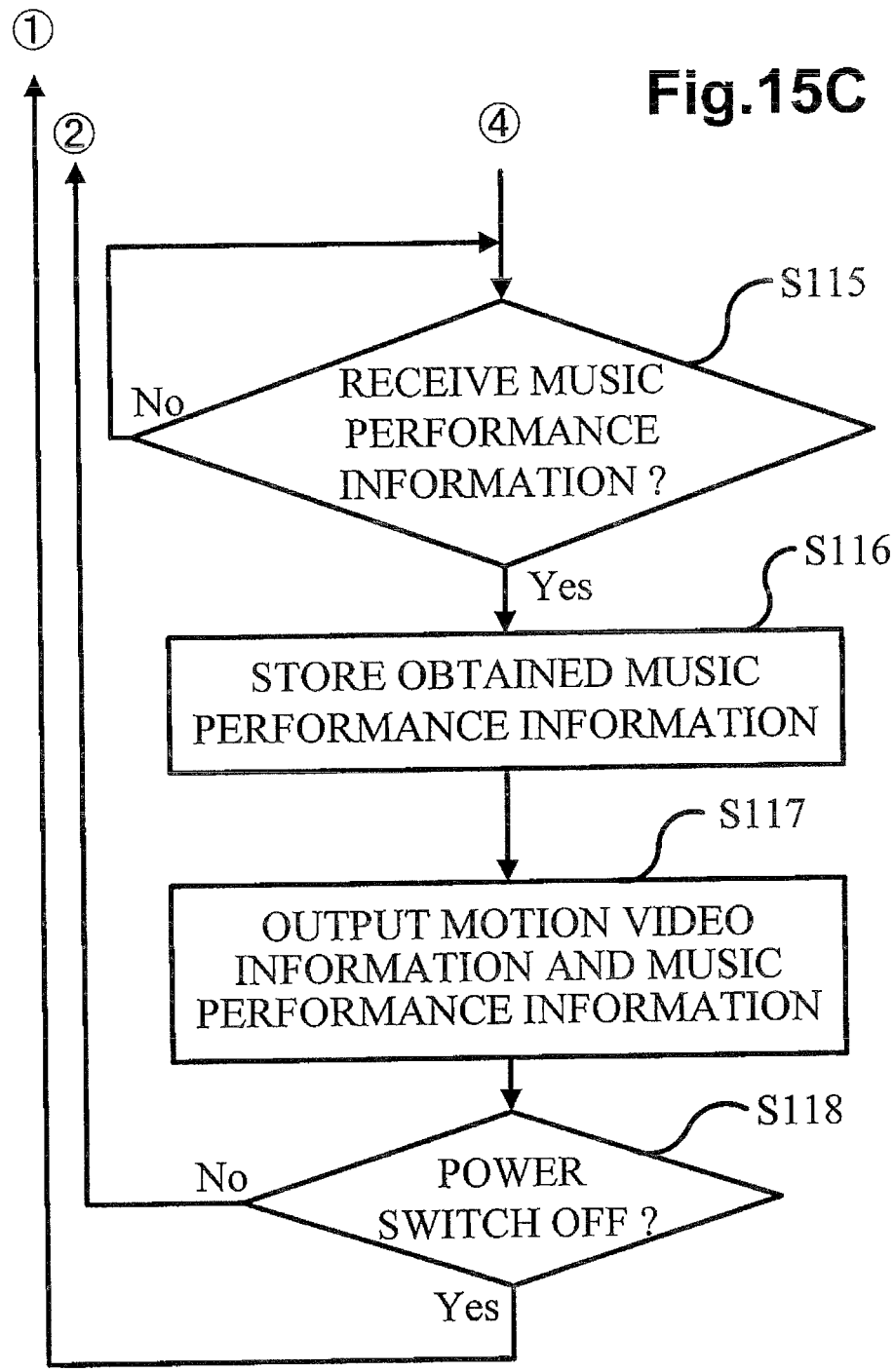

Fig.20

| EXERCISE NAME | MOTION NUMBER | MOTION TEMPO | REPEAT TIME | MOTION INFORMATION | MUSIC INFORMATION |
|---|---|---|---|---|---|
| EXERCISE A | 1 | 120 | 8 | SQUAT | TT |
| | 2 | 80 | 6 | KNEE UP | Continue |
| | 3 | 90 | 12 | BACK LUNGE | CC |
| | 4 | 90 | 12 | FRONT LUNGE | Null |

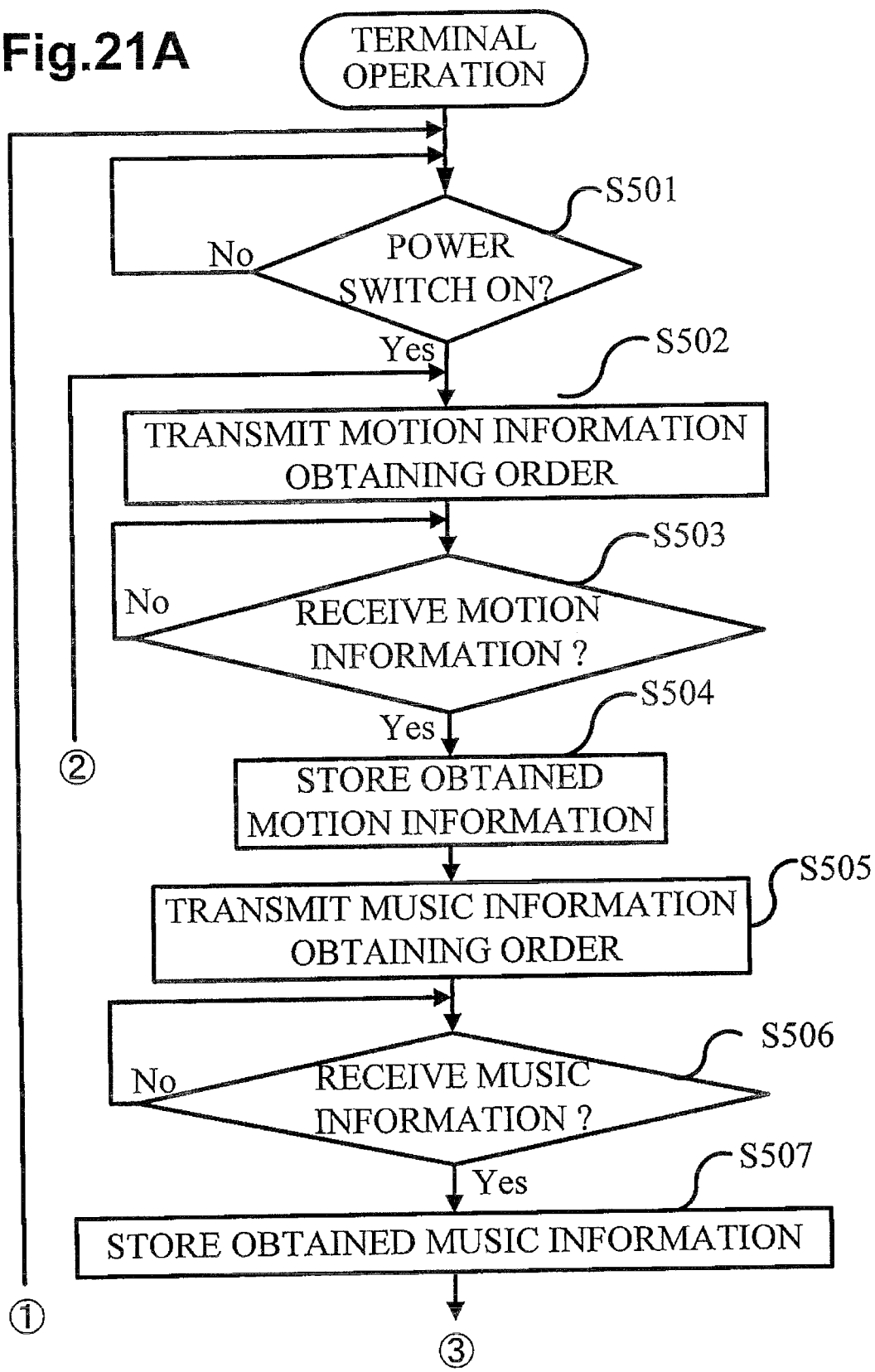

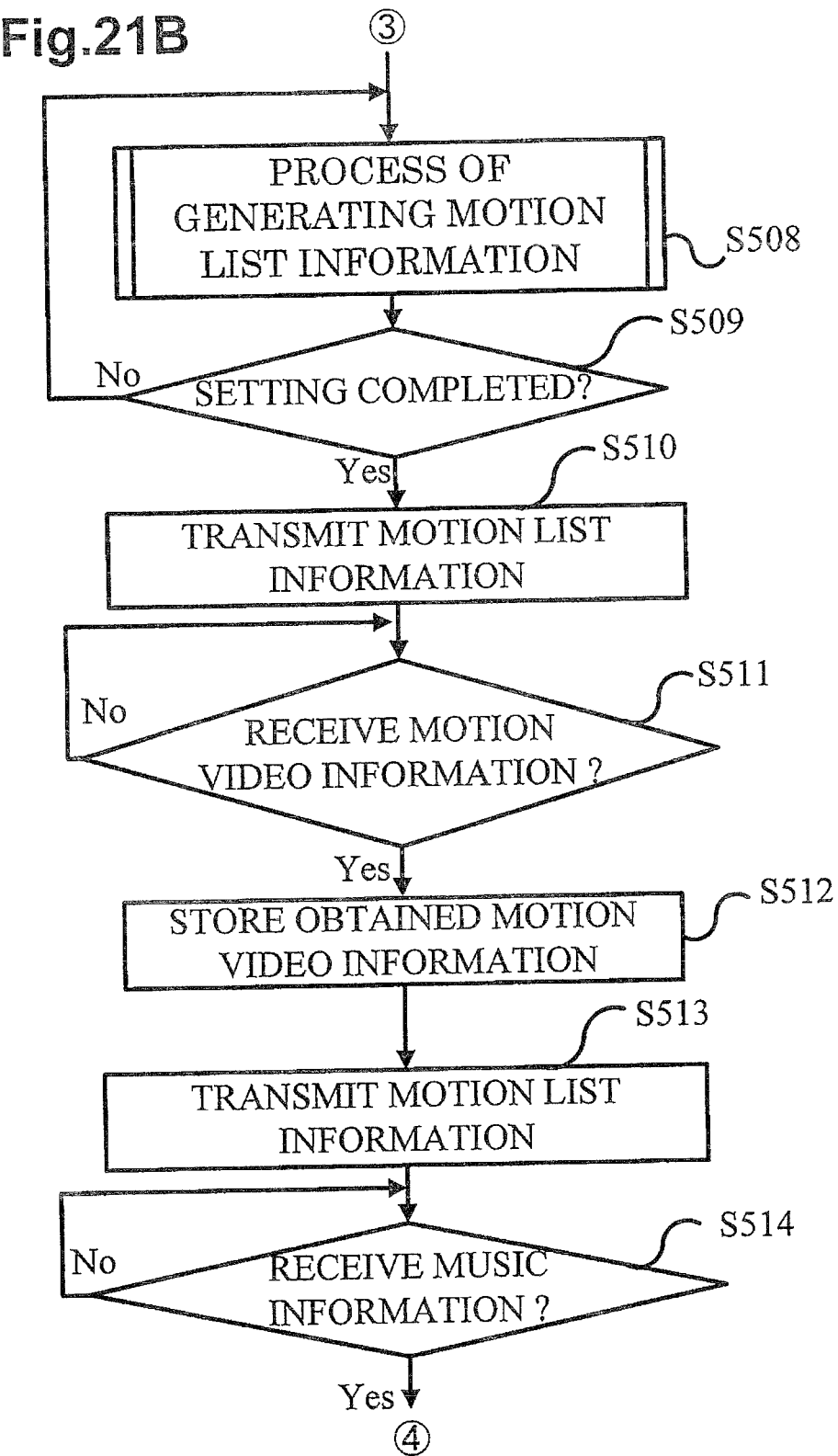

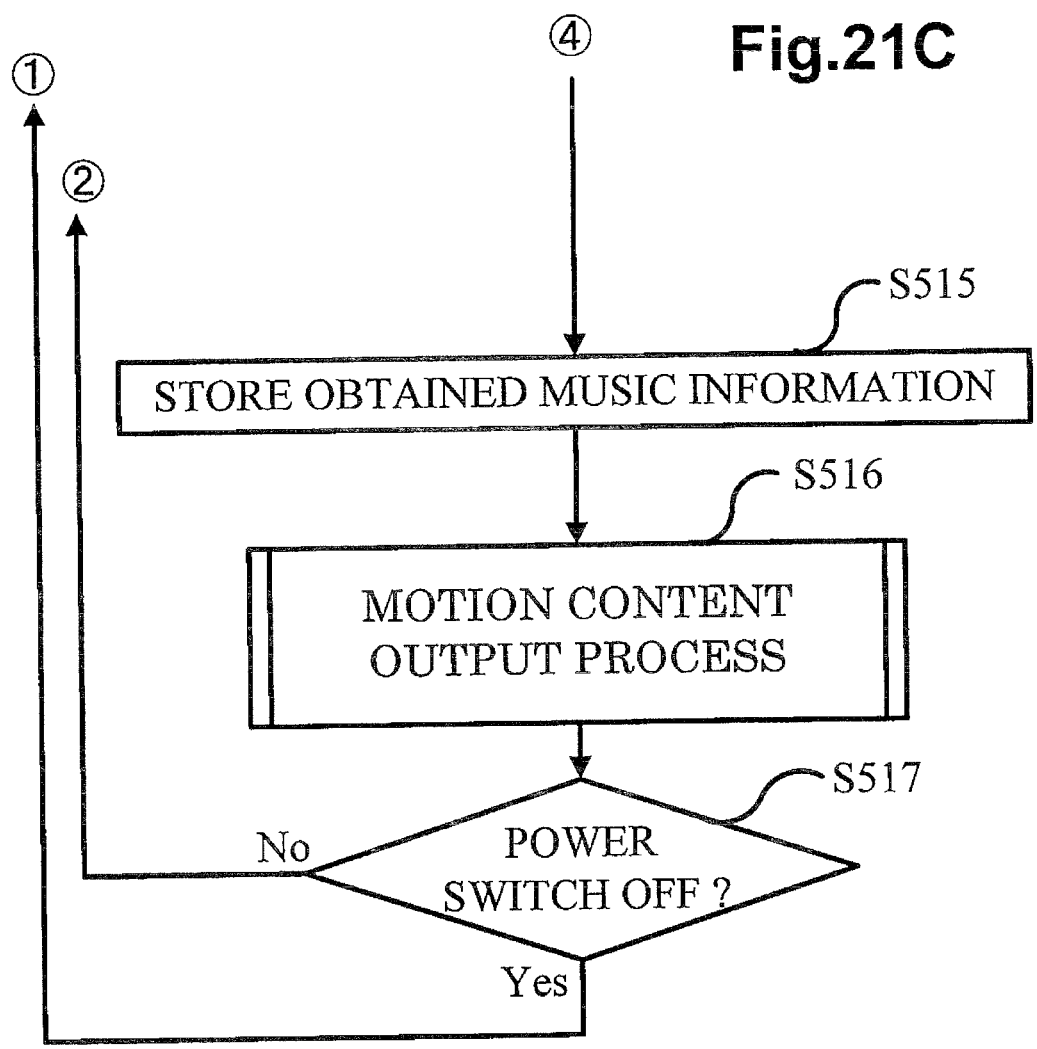

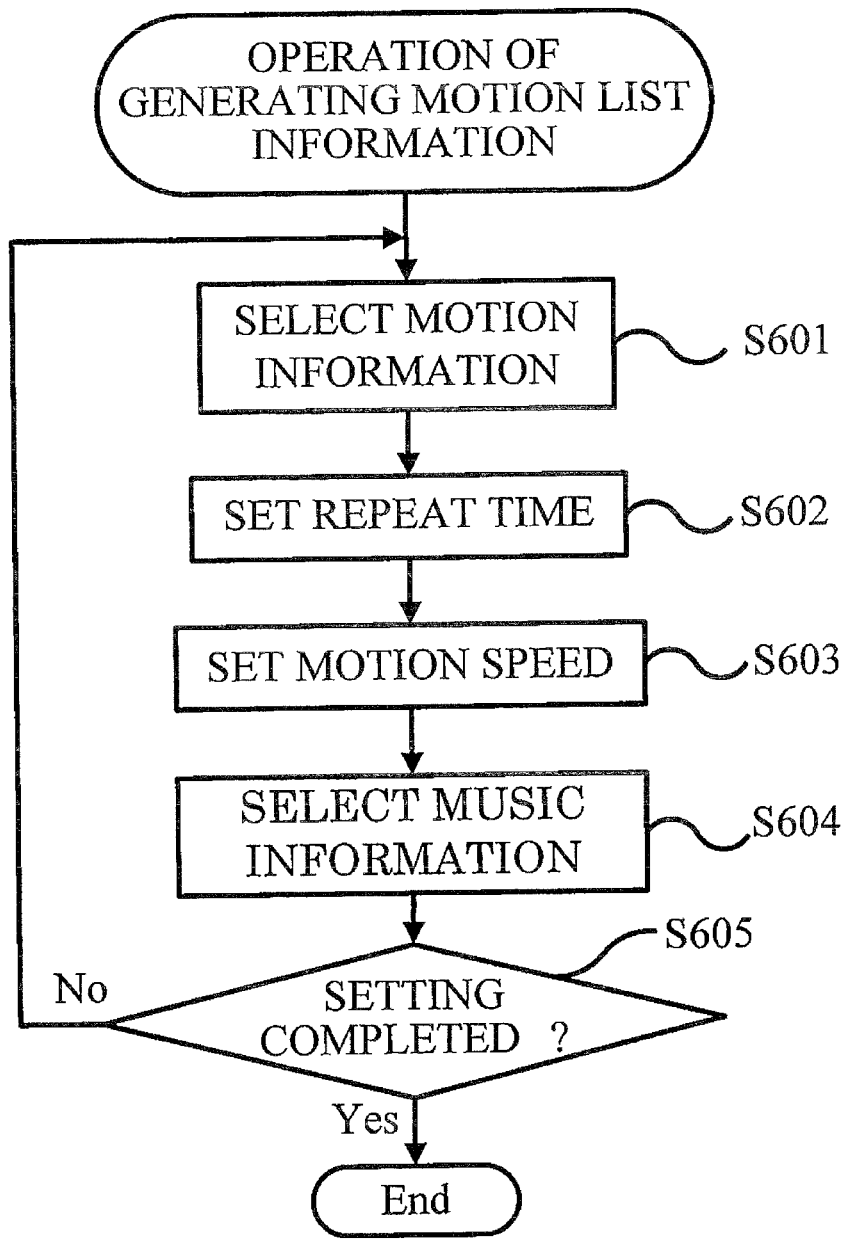

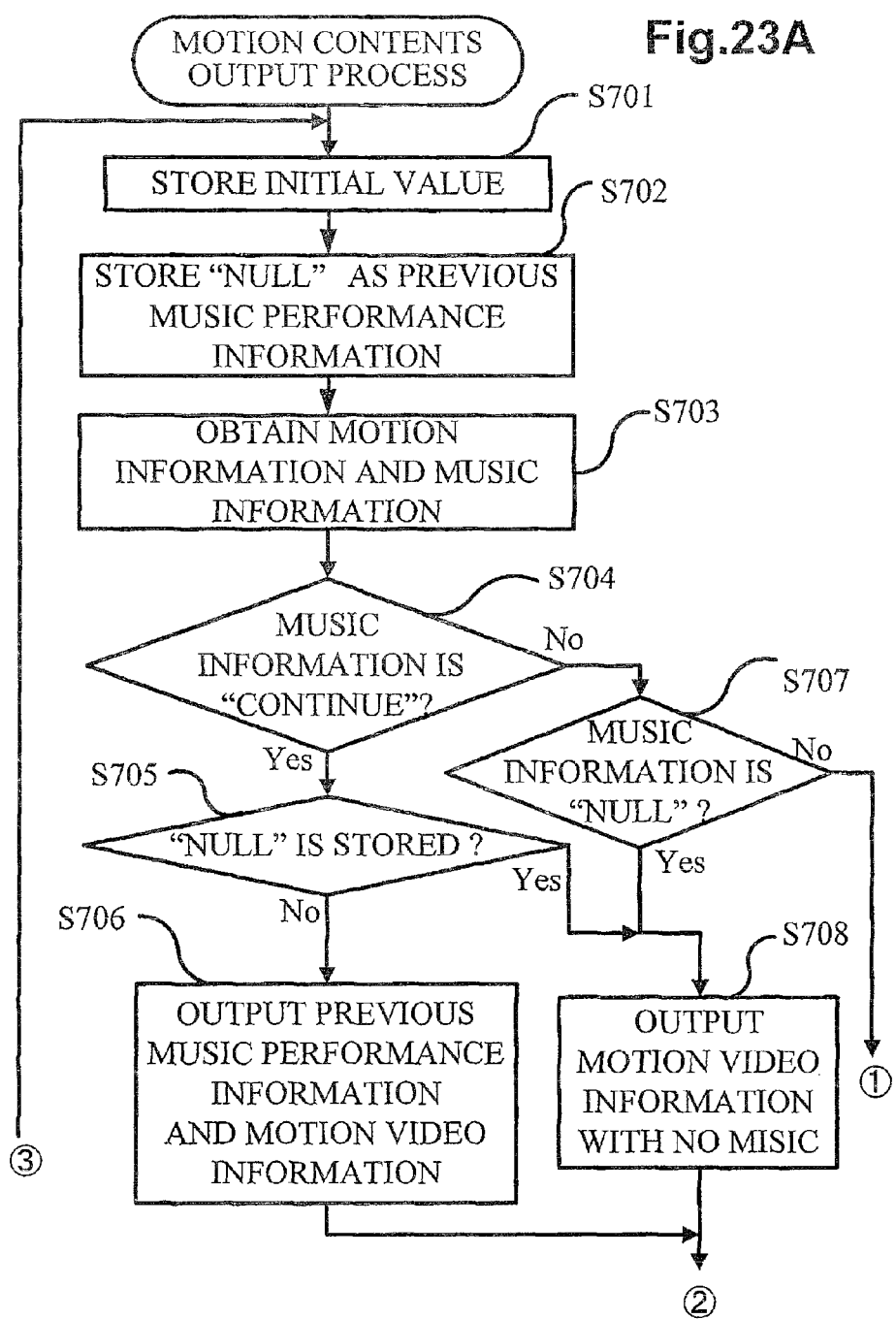

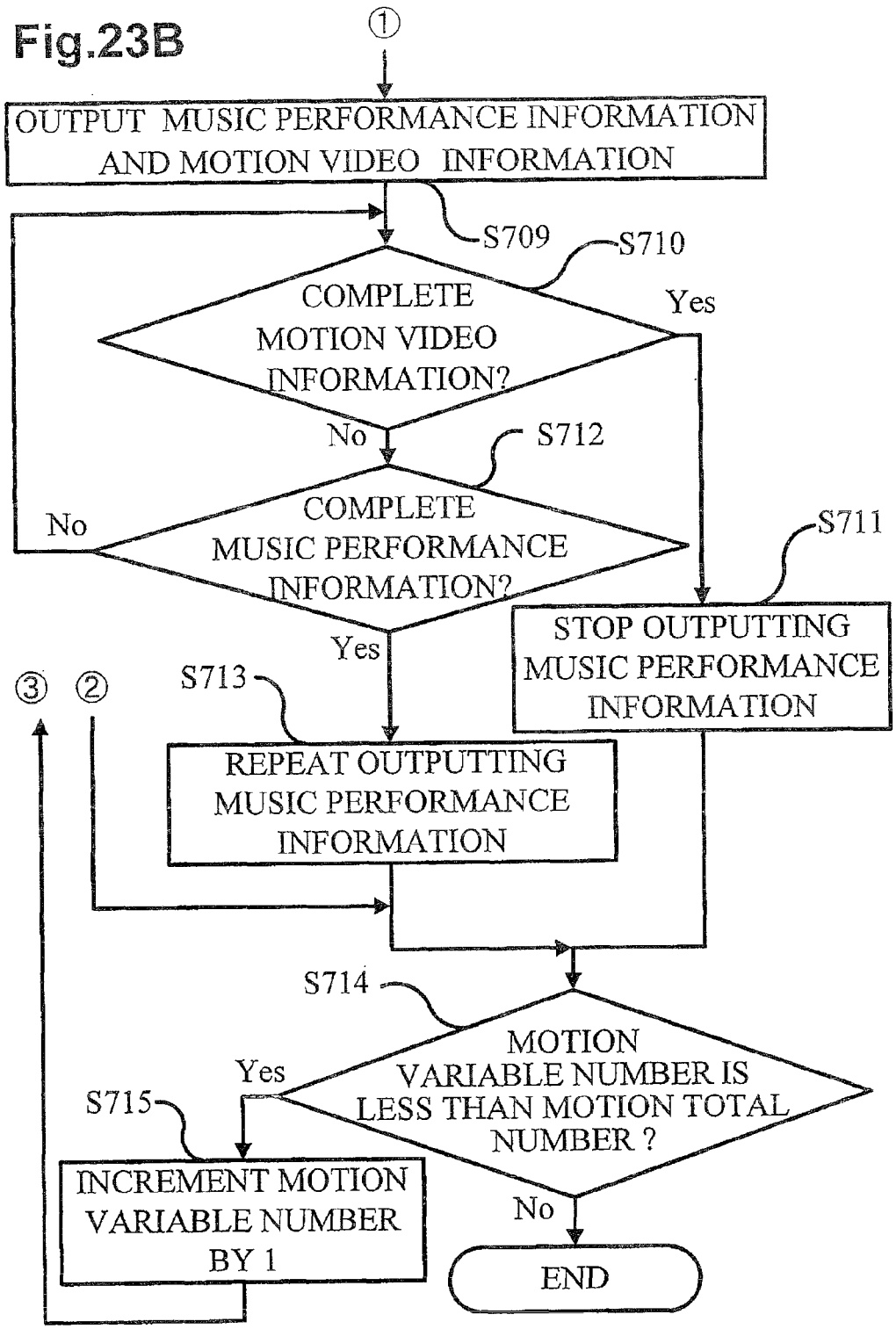

Fig.24

| EXERCISE NAME | MOTION NUMBER | MOTION TEMPO | REPEAT TIME | MOTION INFORMATION | MUSIC INFORMATION |
|---|---|---|---|---|---|
| EXERCISE A | 1 | 120 | 8 | SQUAT | TT |
| | 2 | 80 | 6 | KNEE UP | |
| | 3 | 90 | 12 | BACK LUNGE | AA |
| | 4 | 90 | 12 | FRONT LUNGE | |

INFORMATION PROCESSING APPARATUS, INFORMATION PROCESSING METHOD AND RECORDING MEDIUM STORING PROGRAM

BACKGROUND

The present disclosure relates to a motion contents generation. Specifically, the present disclosure relates to a method of generating motion contents by selecting a certain motion information from plural pieces of motion information, and setting motion speed at which motion designated by the selected motion information is performed.

Generally, there is an art of generating music for motion by selecting motion mode and using tempo function corresponding to the selected motion mode. Specifically, the tempo of the music is adjusted according to the tempo function corresponding to the motion mode selected by a user.

Generally, the tempo of the music is adjusting using the tempo function corresponding to a predetermined motion mode regardless of the type of motion even if there are plural types of motions. The tempo of the music is adjusted only by the predetermined motion mode. Therefore, the number of the generated contents are limited to the number of motion modes regardless of the types of the motions.

SUMMARY

The aspect of the disclosure is to solve the above problem, and is to automatically generate the various motion contents based on plural types of the motions and the motion speeds at which the type of the motion is performed.

An aspect of the disclosure provides the following arrangements:

An information processing apparatus comprising:
a first obtaining portion configured to obtain plural pieces of motion information representing type of motion;
a second obtaining portion configured to obtain motion video information including a video corresponding to the motion information obtained by the first obtaining portion;
a motion list generating portion configured to generate a motion list which includes at least one piece of the motion information among the plural pieces of motion information;
a motion speed setting portion configured to set motion speed at which motion of the motion information included in the motion list is performed;
a third obtaining portion configured to obtain a music;
a video controller configured to output the motion video information corresponding to the motion information in the motion list; and
a music controller configured to output the obtained music according to the motion speed set for the motion information in response to outputting the motion video information by the video controller.

A contents generating method comprising:
obtaining plural pieces of motion information representing type of motion;
obtaining motion video information including a video corresponding to the obtained motion information;
generating a motion list which includes at least one piece of the motion information among the plural pieces of motion information; setting motion speed at which motion of the motion information included in the motion list is performed;
obtaining a music;
outputting the motion video information corresponding to the motion information in the motion list; and
outputting the obtained music according to the motion speed set for the motion information in response to outputting the motion video information.

A non-transitory computer readable recording medium storing a program causing a computer to perform:
obtaining plural pieces of motion information representing type of motion;
obtaining motion video information including a video corresponding to the obtained motion information;
generating a motion list which includes at least one piece of the motion information among the plural pieces of motion information;
setting motion speed at which motion of the motion information included in the motion list is performed;
obtaining a music;
outputting the motion video information corresponding to the motion information in the motion list; and
outputting the obtained music according to the motion speed set for the motion information in response to outputting the motion video information.

BRIEF DESCRIPTION OF DRAWINGS

FIG. 4 is a conceptual diagram showing a storage state in which motion information is stored in a motion information storage area 121 according to the first embodiment.

FIG. 5 is a conceptual diagram showing a storage state in which a motion video information is stored in a motion video information storage area 122 according to the first embodiment.

FIG. 7 is an illustrative diagram showing a coordinate position of P1-P17 representing each body part of FIG. 6B to display a predetermined action of a player according to the first embodiment.

FIG. 10 is a conceptual diagram showing a storage state in which music information is stored in a music information storage area 121 according to the first embodiment.

FIG. 11 is a conceptual diagram showing a storage state in which a music performance information is stored in a music performance information storage area 222 according to the first embodiment.

FIG. 13 is a conceptual diagram showing a storage state in which first motion list information is stored in a first motion list information temporary storage area 85 according to the first embodiment.

FIG. 14 is a conceptual diagram showing a storage state in which second motion list information is stored in second motion list information temporary storage area 86 according to the first embodiment.

FIG. 15A, FIG. 15B and FIG. 15C are flowcharts showing process of an operation in the output terminal 1 of the contents generation system 100 according to the first embodiment.

FIG. 20 is a conceptual diagram showing a storage state in which motion list information is stored in a motion list information temporary storage area 87 according to the second embodiment.

FIG. 21A, FIG. 21B and FIG. 21C are flowcharts showing a process of an operation in the output terminal 1 of the contents generation system 100 according to the second embodiment.

FIG. 22 is a flowchart carrying out motion list information generation process of the output terminal 1 according to a motion list information generation process program 713 according to the second embodiment.

FIG. 23A and FIG. 23B are flowcharts carrying out a motion contents output process of the output terminal 1 according to a motion contents output process program 714 according to a second embodiment.

FIG. 24 is a conceptual diagram showing a storage state in which motion list information and second motion list information are stored in a motion list information temporary storage area 87 or a second motion list information temporary storage area 86.

DESCRIPTION OF EXEMPLARY EMBODIMENTS

First Embodiment

Figure 1:
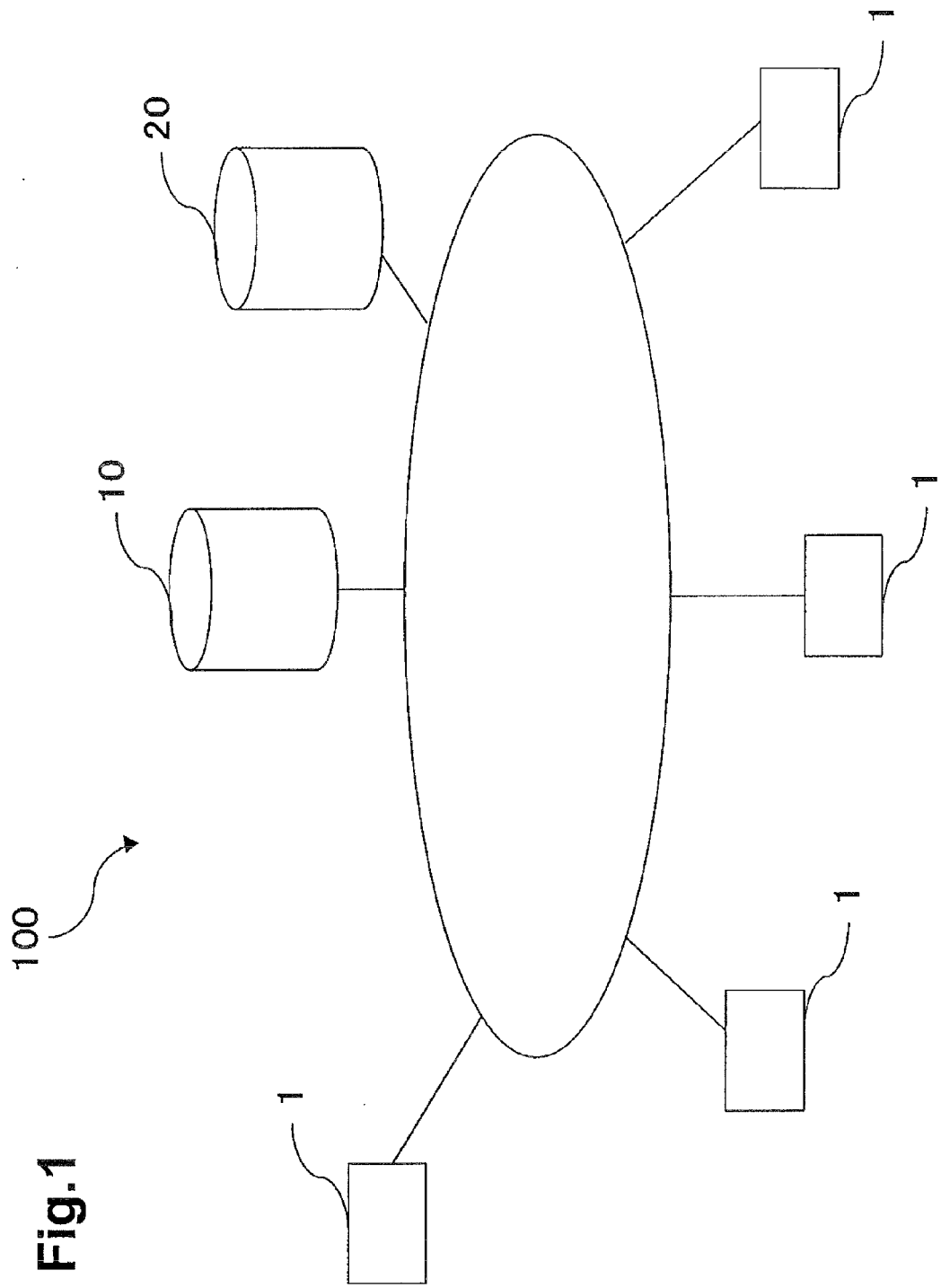
FIG. 1 is a schematic diagram of a contents generation system 100 according to a first embodiment.
Figure 2:
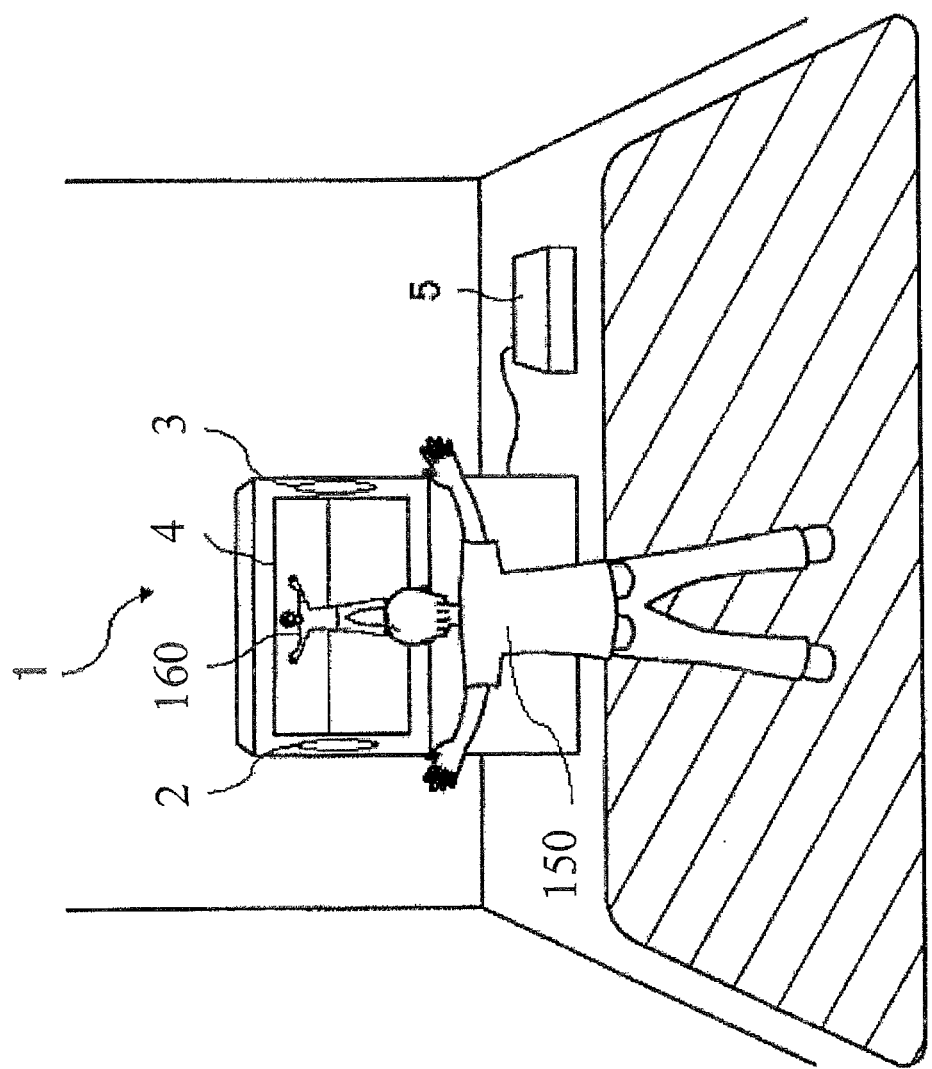
FIG. 2 is an appearance of the contents generation system 100 according to the first embodiment.
Figure 3:
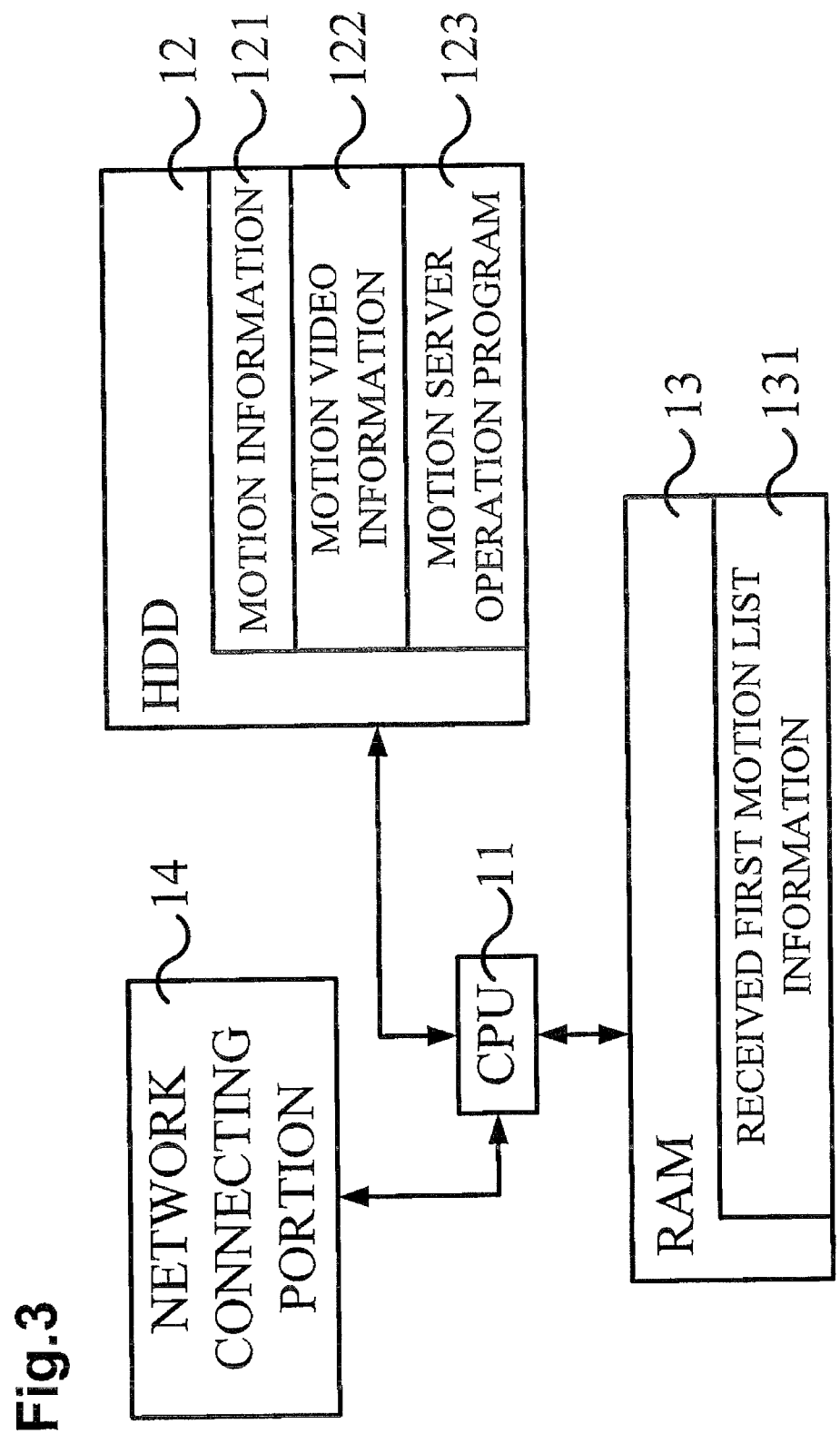
FIG. 3 is a block diagram showing an electrical configuration of a motion server 10 in the contents generation system 100 according to the first embodiment.

A contents generation system according to a first embodiment will be described with reference to drawings below.
<Configuration of Contents Generation System According to First Embodiment>
As shown in FIG. 1, the contents generation system 100 includes an output terminal 1, a motion server 10 and a music server 20. The output terminal 1, the motion server 10 and the music server 20 are connected each other through an Internet. The output terminal 1 outputs motion contents including motion video information and music performance information.
<Outside Structure of Output Terminal 1 According to First Embodiment>
As shown in FIG. 2, the output terminal 1 is provided with a speaker 2, speaker 3, a display and an information inputting portion 5. The display 4 displays a motion video 160. When the display 4 displays the motion video 160, the speakers 2 and 3 output music which is output together with the motion video 160. A user inputs information for selecting motion and information for selecting music using the information inputting portion 5. For example, the information inputting portion 5 includes a keyboard and a mouse. As shown in FIG. 2, the user 150 can exercise while viewing the motion video 160 displayed on the display 4.
<Electrical Configuration of Motion Server 10 According to First Embodiment>
As shown in FIG. 3, the motion server 10 is provided with a CPU 11 controlling the motion server 10. HDD 12, RAM 13 and a network connecting portion 14 are electrically connected to the CPU 11. CPU 11 and a storage device such as HDD 12 and RAM 13 form a computer which controls and processes an operation of the motion server 10. The network connecting portion 14 communicates with the output terminal through the Internet.

The HDD 12 provided in the motion server 10 has a storage area 121 for motion information, a storage area 122 for motion video information and a storage area 123 for motion server operation program information.

The storage area 121 stores plural pieces of motion information. The motion information is information representing a type of the motion. As shown in FIG. 4, "arm curl", "squat" etc. representing the motion are stored in the storage area 121 as the motion information. The user of the output terminal 1 can generate new motion contents by updating the motion information stored in the storage area 121.

Figure 6A:
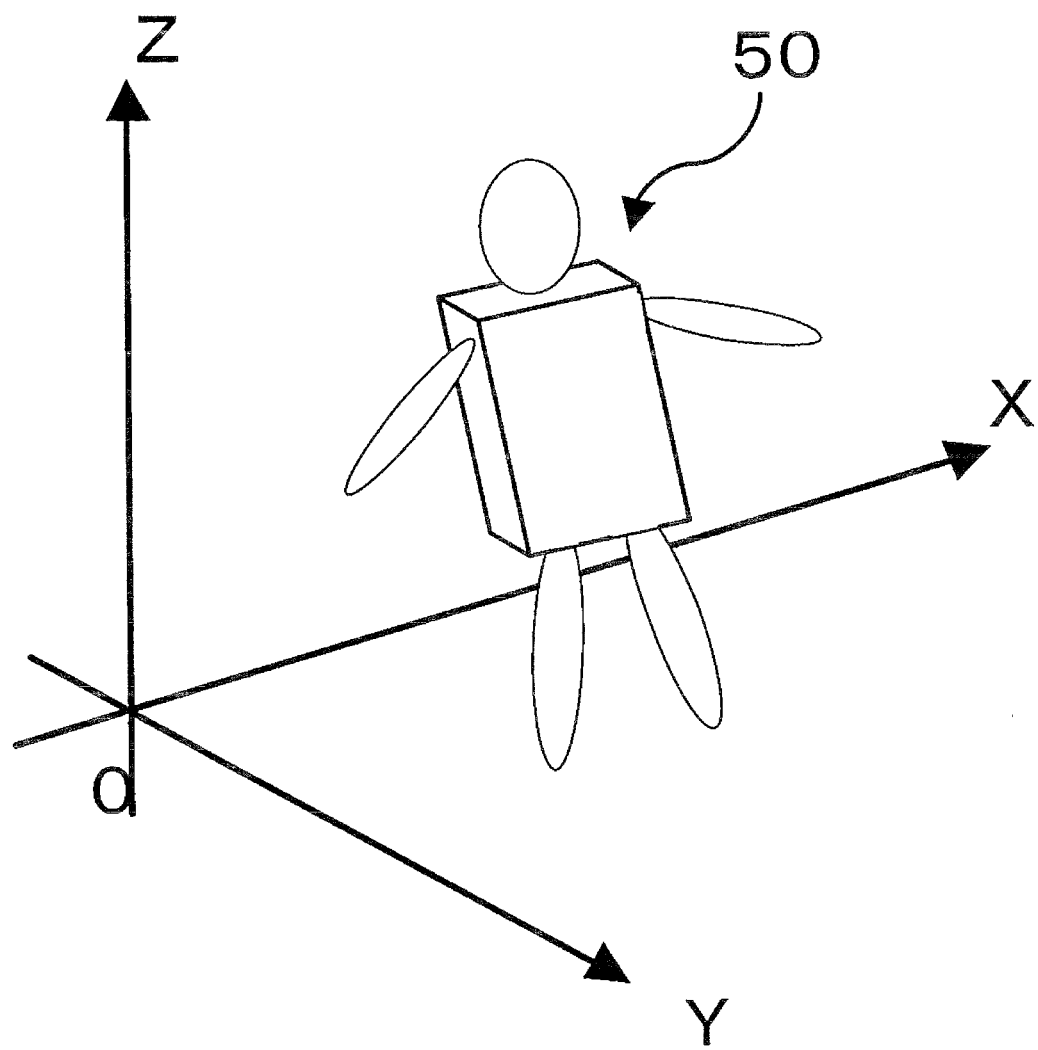
FIGS. 6A and 6B are conceptual diagrams showing a display state in which the display displays video information 50 according to the first embodiment.
Figure 6B:
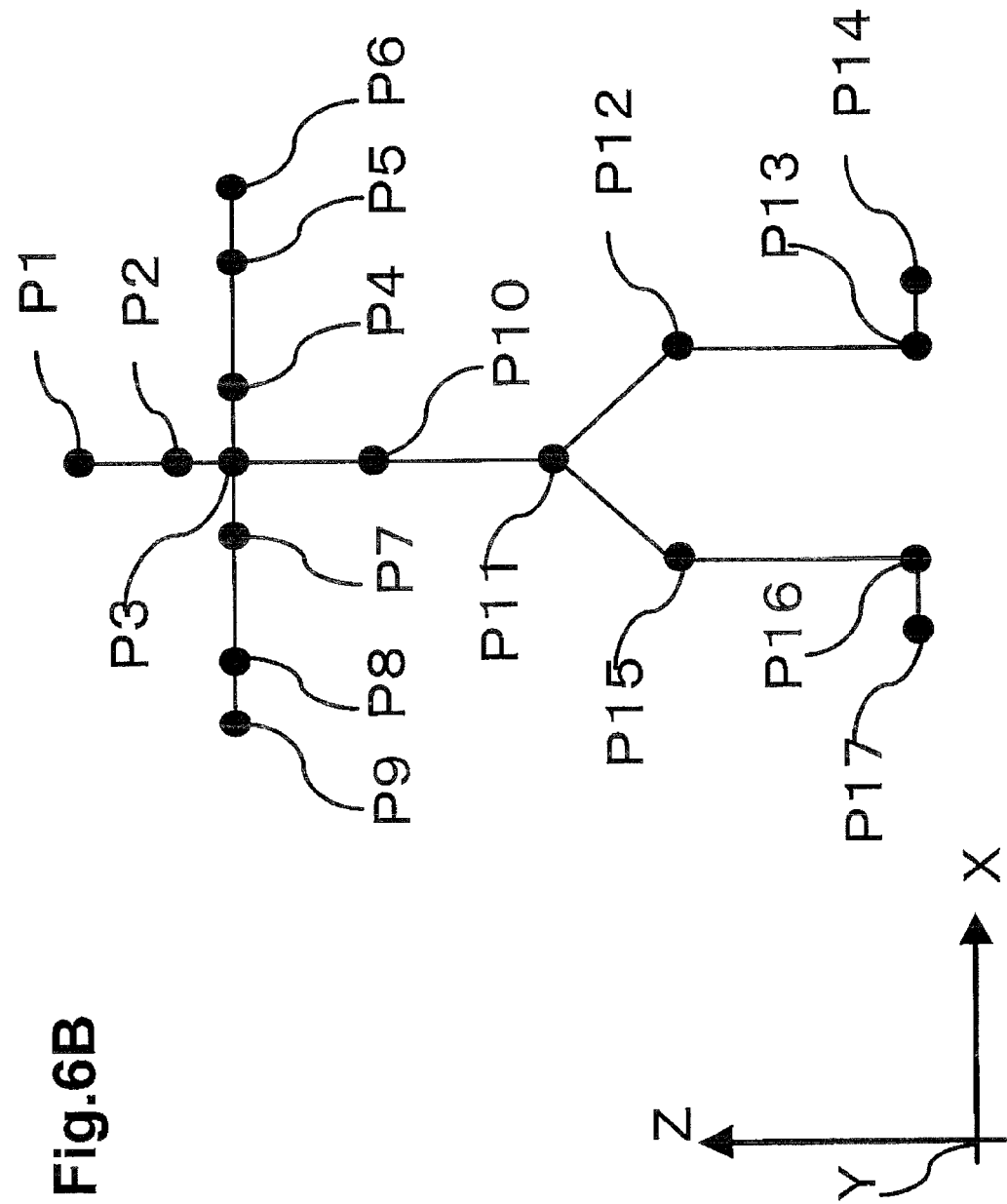
Figure 8:
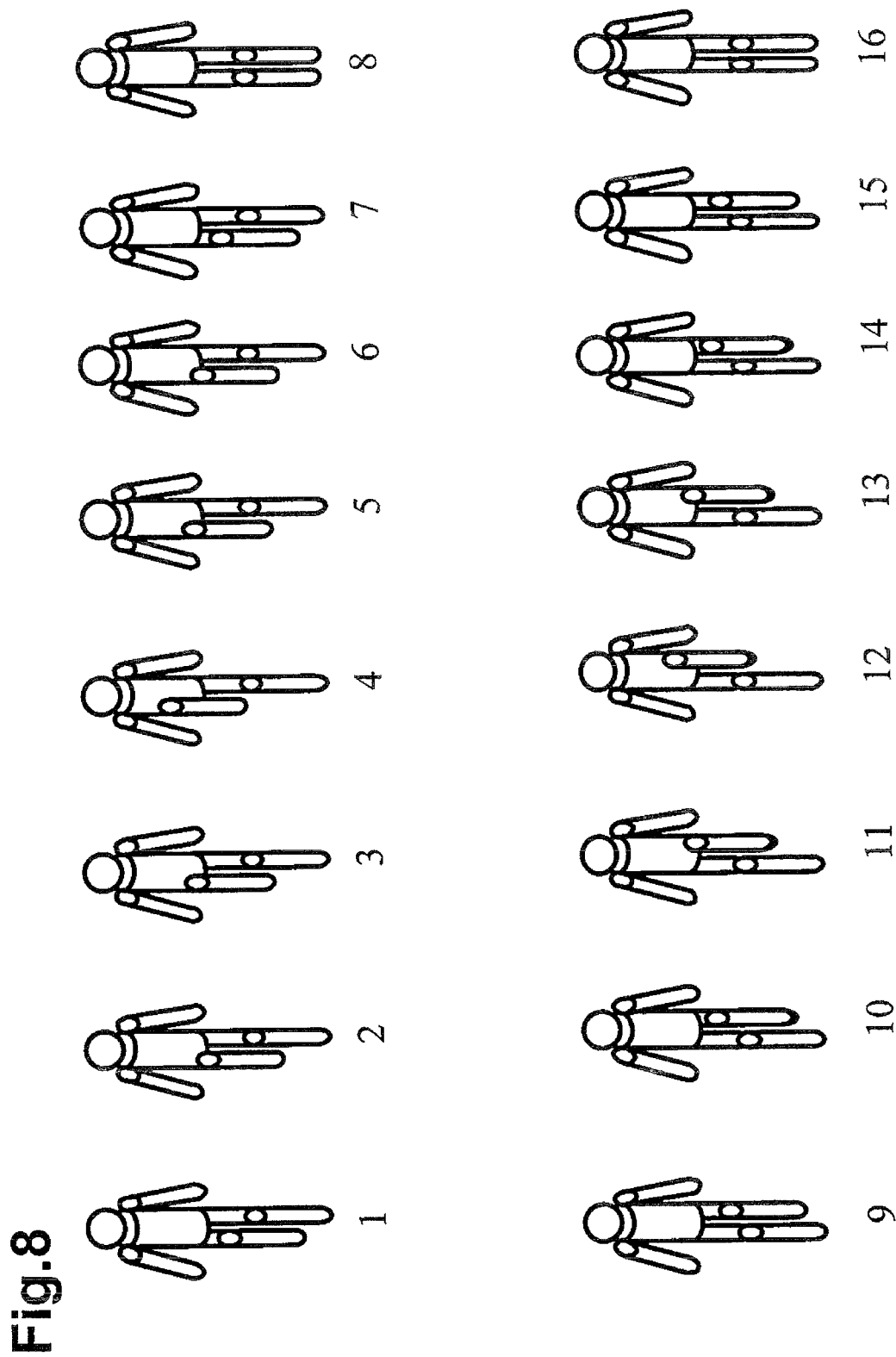
FIG. 8 is a conceptual diagram showing a display state in which a display 4 displays the video information stored in a motion video information storage area 73 according to the first embodiment.

The storage area 122 for motion video information stores motion video information. The motion video information represents an video corresponding to the motion information. As shown in FIG. 5, "Arm Curl Video" is stored in the storage area 122 as the motion video information corresponding to the motion information "Arm Curl". In the same manner, "March Video" is stored in the storage area 122 as the motion video information corresponding to the motion information "March". The video information of FIG. 6A is generated based on the coordinate position of each body part as shown in FIG. 6B. A video representing coordinate positions in X axis, Y axis and Z axis for P1-17 representing the body part shown in FIG. 7 shows a still image. A plurality of the still images of the video showing the coordinate positions shown in FIG. 7 are sequentially displayed on the display 4, thereby the video showing a body performing a predetermined motion is displayed on the display 4. "1" to "16" in FIG. 8 represents an order of the still images to be displayed on the display 4. By sequentially displaying the still images corresponding to "1" to "16" in FIG. 8 on the display 4, the motion "March" is played back once as video. A still image group representing predetermined motion information shown in FIG. 8 is stored in the storage area 122. The motion vide information is read out from the storage area 122 one time or several times corresponding to how many time the motion "March" would be performed, and then displayed on the display 4. By updating the motion video information stored in the storage area 122, the user of the output terminal 1 can generate a new motion contents.

The storage area 123 for motion server operation program information stores motion server operation program information. The motion server operation program information is a program for controlling the motion server 10. The motion server 10 obtains first motion list information from the output terminal 1 through the network connecting portion 14. By the motion server program information, the motion server 10 transmits to the output terminal 1 the motion video information corresponding to the motion information forming the first motion list information according to the obtained first motion list information. The first motion list information will be described later.

The RAM 13 has a storage area 131 for temporarily storing received first motion list information. The storage area 131 stores the first motion list information received from the motion server 10. The first motion list information includes the motion information. The motion information of the first motion list information is selected from plural pieces of the motion information shown in FIG. 4 using the information inputting portion 5 by the user 150. The motion server 10 obtains the first motion list information from the output terminal 1 through the network connecting portion 14.

<Electrical Configuration of Music Server 20 According to First Embodiment>

Figure 9:
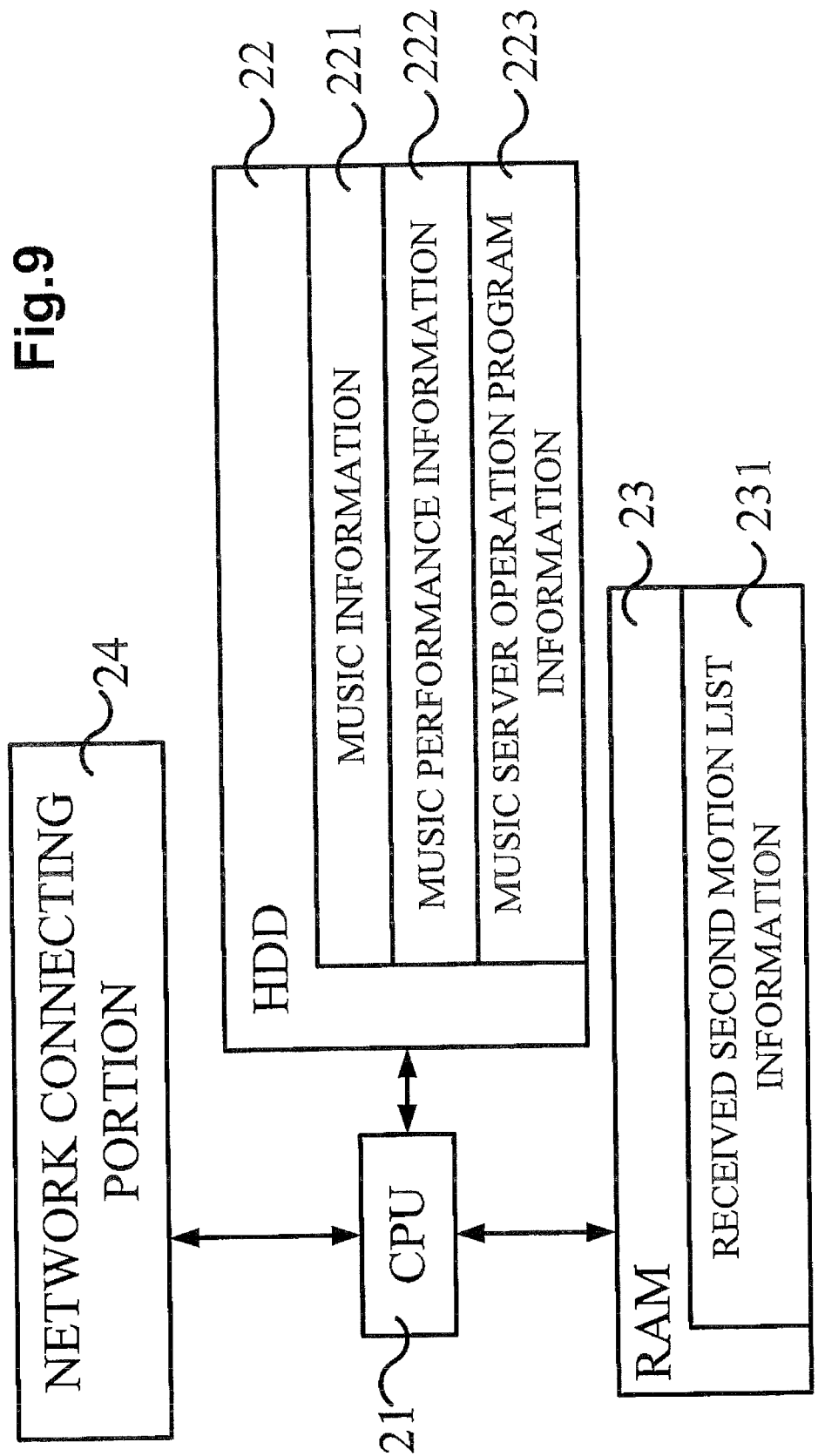
FIG. 9 is a block diagram showing an electrical configuration of a music server 20 in the contents generation system 100 according to the first embodiment.

As shown in FIG. 9, the music server 20 includes a CPU 21 for controlling the music server 20. HDD 22, RAM 23 and a network connecting portion 4 are electrically connected to the CPU 21. The CPU 21 and a storage device such as HDD 22 and RAM 23 form a computer for controlling and processing the operation of the music server 20. The network connecting portion 24 communicates with the output terminal 1 through the Internet.

The HDD 22 of the music server 20 has a storage area 221 for music information, a storage area 222 for music performance information and a storage area 223 for music server operation program information.

Figure 10:
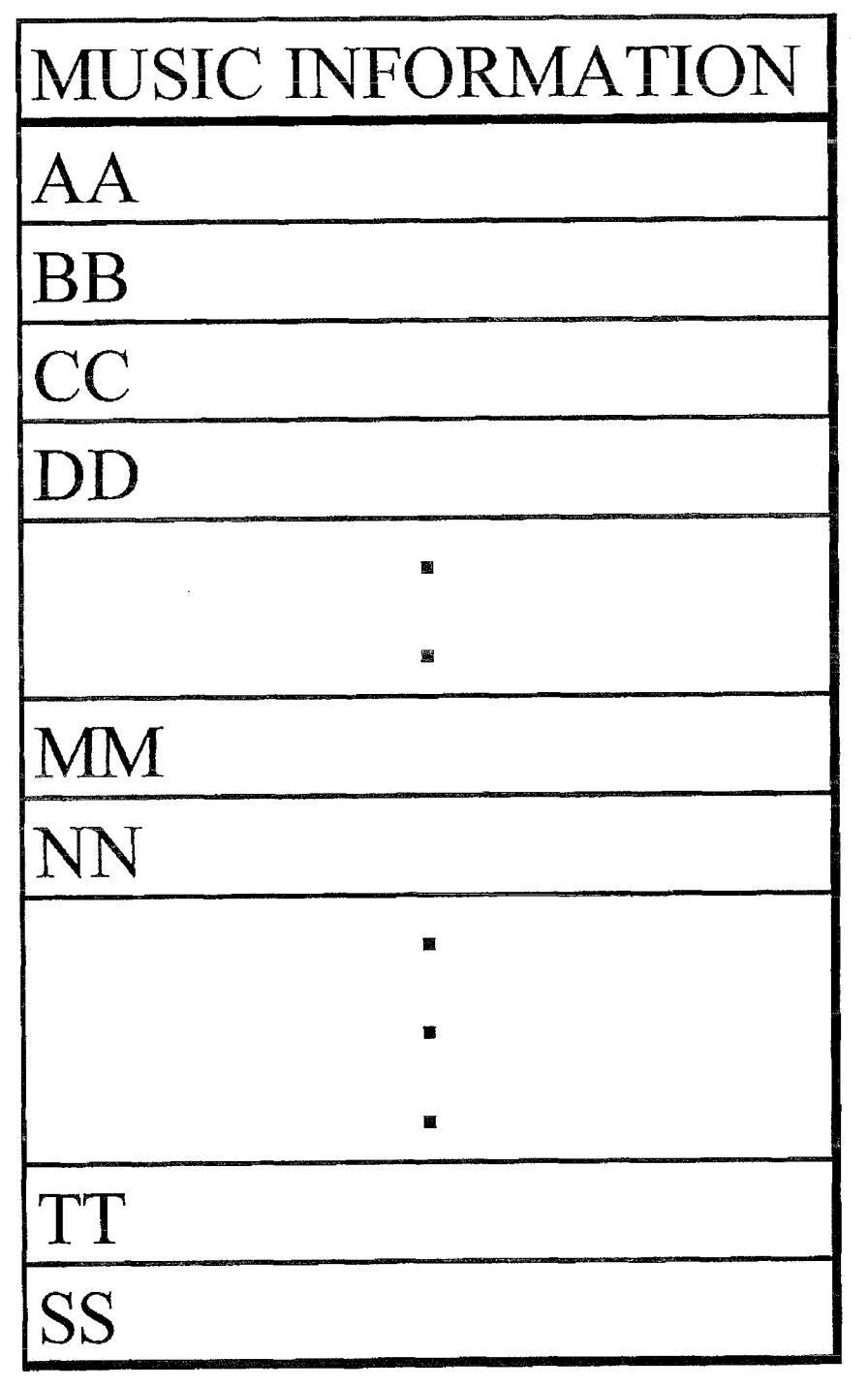

The storage area 221 for music information stores plural pieces of music information. The music information is information representing music. As shown in FIG. 10, "AA", "BB" representing each music are stored in the storage area 221 as the music information. The music information may be a music name representing each music. The music information may be a ID code representing each music. The user of the output terminal 1 can generate new motion contents by updating the music information stored in the storage area 221.

The storage area 222 stores plural pieces of music performance information. The music performance information is playing information for outputting music performance information from the speaker 2 and 3. The storage area 222 stores the music information and the music performance information while being correlated together. As shown in FIG. 11, "AA performance.midi" as the music performance information corresponding to the music information "AA" is stored in the music performance information as the music performance information. In the first embodiment, MIDI data is store in the storage area 222 as the music performance information. The user of the output terminal 1 can generate the motion contents by updating the music performance information stored in the storage area 222. Although MIDI data is stored in the first embodiment, the music performance information other than MID data can be stored in the storage area 222.

The storage area 223 for music server operation program information stores the music server operation program information. The music server operation program information is a program for controlling the music server 20. The music server 20 obtains second motion list information through the network connecting portion 24 from the output terminal 1. According to the music server program information, the music server 20 performs the process shown below. Specifically, the music server 20 transmits to the output terminal 1 the music performance information corresponding to the music information of the second motion list information according to the obtained second motion list information. The second motion list information will be described later.

The RAM 23 has a storage area 231 for temporarily storing received second motion list information. The storage area 231 stores the second motion list information received by the music server 20. The second motion list information includes the motion information and the music information. The motion information of the second motion list information is selected from plural pieces of the motion information shown in FIG. 4 using the information inputting portion 5 by the user. The music information of the second motion list information is selected from the plural pieces of the music information shown in FIG. 10 using the information inputting portion 5 by the user 150. The second motion list information is obtained from the output terminal 1.

<Electrical Configuration of Output Terminal 1 According to First Embodiment>

Figure 12:
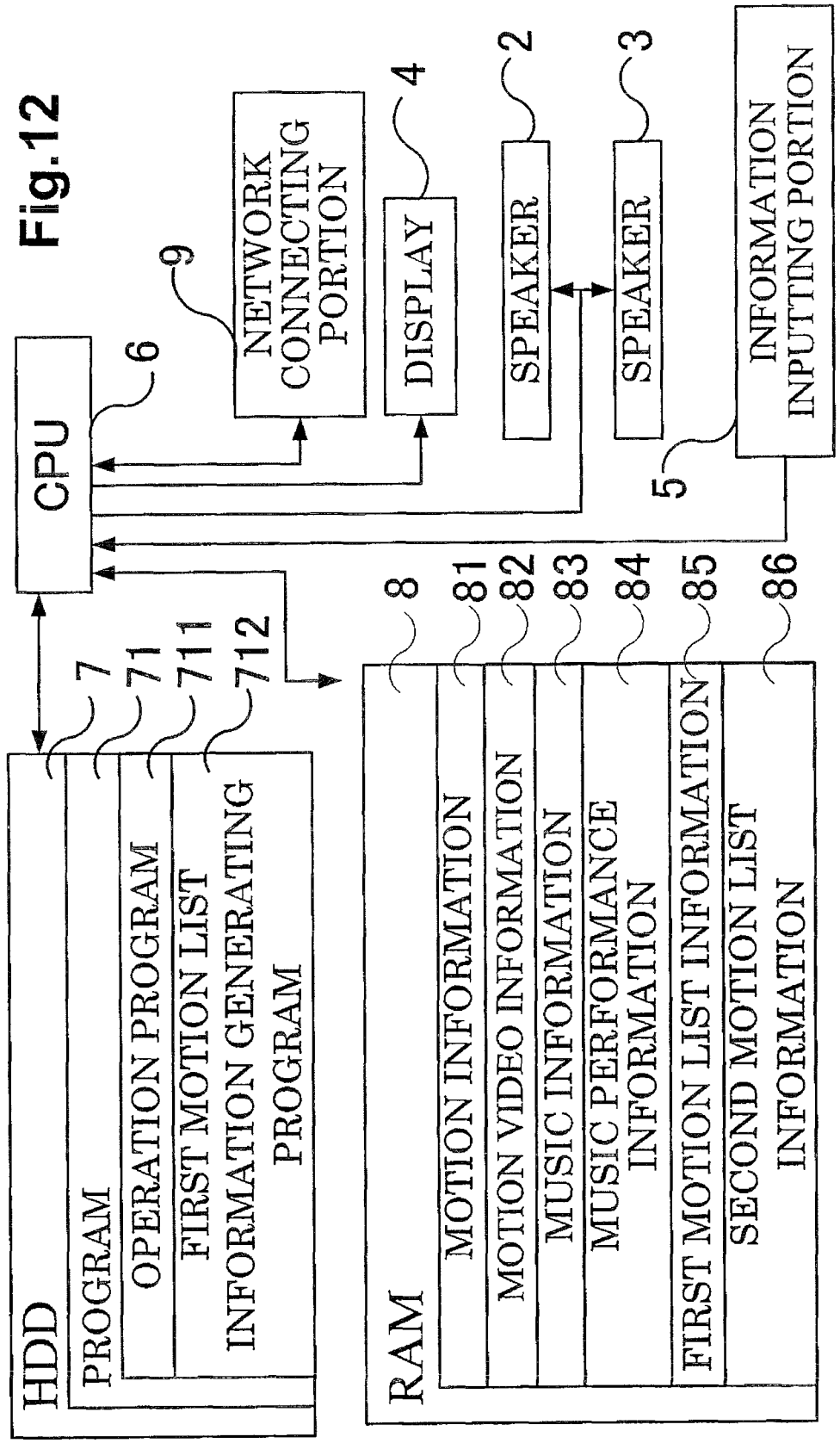
FIG. 12 is a block diagram showing an electrical configuration of an output terminal 1 in the contents generation system 100 according to the first embodiment.

As shown in FIG. 12, the output terminal 1 is provided with a CPU 6 for controlling the output terminal 1. The speakers 2 and 3, the display 4, the information inputting portion 5, the HDD 7, the RAM 8 and the network connecting portion 9 are electrically connected to the CPU 6. The CPU and a storage device such as HRR 7, RAM 8 form a computer for controlling the operation of the output terminal 1. The network connecting portion 9 communicates with the motion server 10 and the music server 20 through the Internet.

The HDD 7 has a storage area 71 for program information. The program information storage area 71 includes a storage area 711 for terminal operation program information and a storage area 712 for first motion list information generation program information. The storage area 711 stores program information for controlling the output terminal 1. The storage area 712 stores program information for generating the first motion list information.

The RAM 8 includes a storage area 81 for temporarily storing the motion information, a storage area 82 for temporarily storing the motion video information, a storage area 83 for temporarily storing the music information, a storage area 84 for temporarily storing the music performance information, a storage area 85 for temporarily storing the first motion list information and a storage area 86 for temporarily storing the second motion list information.

The storage area 81 temporarily stores the motion information. The motion information stored in the storage area 81 is obtained from the storage area for the motion information of the motion server 10 through the network connecting portion 9.

The storage area 82 temporarily stores the motion video information corresponding to the motion information of the first motion list information. The motion video information corresponding to the motion information of the first motion list information is obtained from information stored in the storage area 122 for the motion video information provided in the motion server 10.

The storage area 83 temporarily stores the music information. The music information stored in the storage area 83 is obtained from the storage area 221 for the music information of the music server 20 through the network connecting portion 9.

The storage area 84 temporarily stores the music performance information corresponding to the music information of the second motion list information. The music performance information corresponding to the music information of the second motion list information is obtained from the information stored in the storage area 222 for the music performance information of the music server 20.

The storage area 85 stores the first motion list information. As shown in FIG. 13, the first motion list information stores information about motion number, motion tempo as motion speed, repeat time and the motion information. The first motion list information includes "squat", "knee up" "front lunge" as the motion information. As the motion information of the first motion list information, predetermined motion information is selected from the motion information shown in FIG. 4 by the user. The motion number is an order of outputting the motion video information corresponding to the motion information by the output terminal 1. The output terminal 1 sequentially outputs the motion video information from the motion video information corresponding to the motion information whose motion number is small.

The storage area 86 stores the second motion list information. As shown in FIG. 14, the second motion list information stores information about motion number, motion tempo as motion speed, repeat time, motion information and music information. The music information of the second motion list information is selected from the music information stored in the storage area 83 by the user. A music desired by user is assigned to each motion information of the first motion list information shown in FIG. 13. Thereby, the second motion list information is generated. The generated second motion list information is temporarily stored in the storage area 86.

<Explanation of Operation of Output Terminal According to First Embodiment>

Figure 15B:
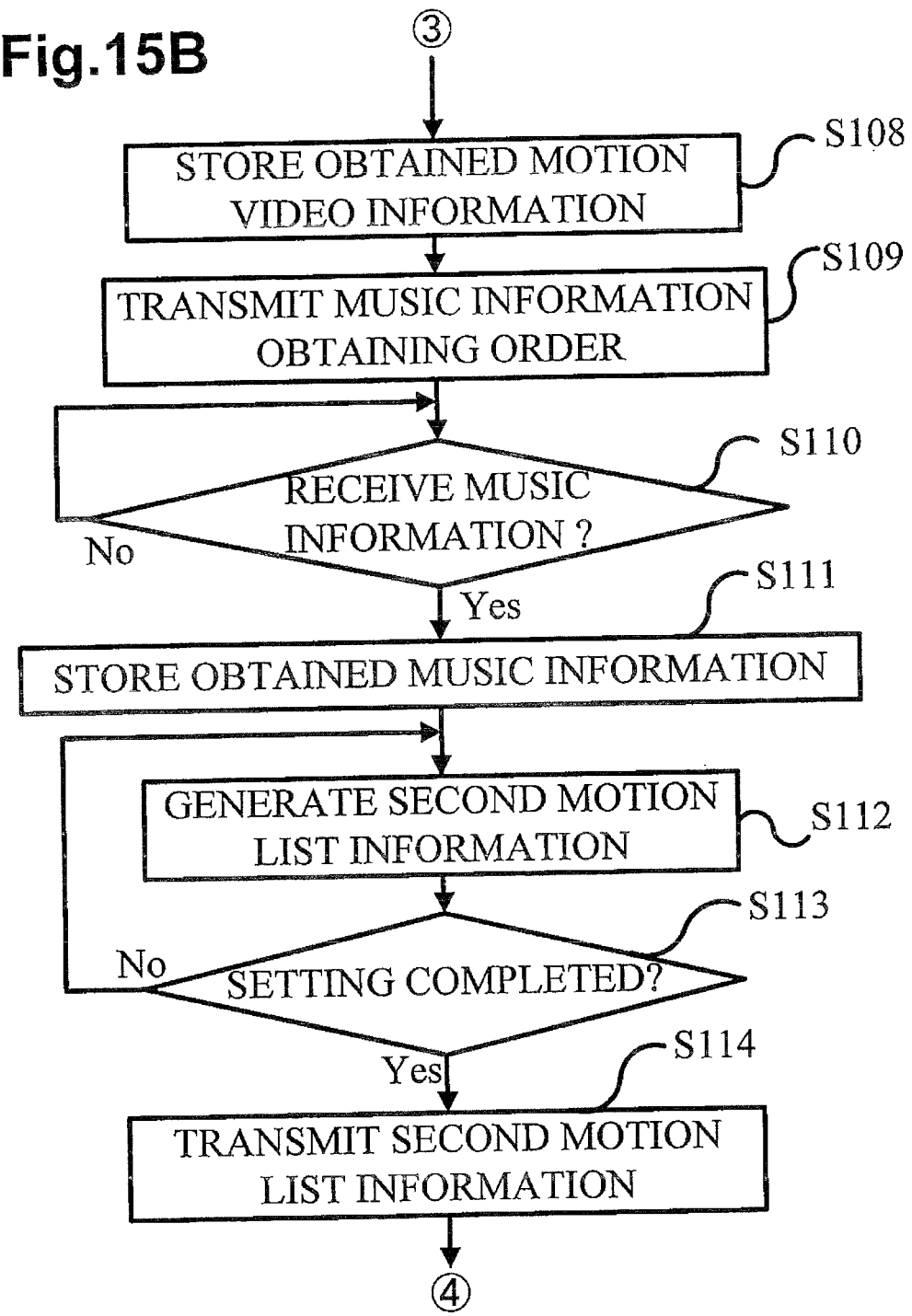

The operation and effect of the output terminal 1 according to the first embodiment will be described. First, the operation and effect of the output terminal 1 will be described with reference to FIG. 15A, FIG. 15B and FIG. 15C. The output terminal is connected to an external power source such as commercial power source through an outlet and the CPU 6 of the output terminal executes the output terminal operation program. By executing the output terminal operation program, the operation of the output terminal is performed. The CPU performs the following process.

First, at step S101, it is judged whether a power switch of the output terminal 1 is turned on by a user. The step S101 is repeated until it is judged that the power switch is turned on. The power switch can be a hardware switch or a power switch implemented by a software.

At step S102, the output terminal 1 transmits a motion information obtaining order to the motion server 10. The motion information obtaining order causes the motion server 10 to transmit to the output terminal 1 the motion information stored in the storage area 121 for motion information. The motion server 10 receiving the motion information obtaining order transmits the information stored in the storage area 121 to the output terminal 1.

At step S103, it is judged whether the motion information transmitted from the motion server 10 is obtained by the output terminal 1 or not. Step S103 is repeated until it is judged that the motion information is obtained. If it is judged that the motion information is obtained, step S104 is performed.

At step S104, the motion information obtained at the step S103 is temporarily stored in the storage area 81 for motion information provided at the output terminal 1.

At step S105, process for generating first motion list information is performed. At step S105, the first motion list information is generated based on the motion information obtained at the step S104. The generated first motion list information is temporarily stored in the storage area 85 for temporarily storing the first motion list information.

At S106, the first motion list information generated at step S105 is transmitted to the motion server 10 from the output terminal 1 through the network connecting portion 9. The first motion list information stored in the storage memory 85 provided in the output terminal 1 is transmitted to the motion server 10.

At step S107, it is judged whether the motion video information of the first motion list information transmitted from the output terminal 1 to the motion server 10 at step S105 is received by the output terminal 1 or not. The motion video information is transmitted from the motion server 10 to the output terminal 1. Step S107 is repeated until the motion video information is received. If the motion video information is received, step S108 is performed. By comparing the motion video information of the first motion list information stored in the storage area 85 with the motion video information received by the output terminal 1 and stored in the storage area 82, it is judged whether the motion vide information is received or not.

At step S108, the motion video information received at step S107 is temporarily stored in the storage area 82 provided in the output terminal 1.

At step S109, the output terminal 1 transmits the music information obtaining order to the music server 20. The music information obtaining order causes the music server 20 to transmit the music information stored in the storage area 221 of the music server to the output terminal 1. The music server 20 receiving the music information obtaining order transmits the music information stored in the storage memory 221 of the music server 20 to the output terminal 1.

At step S110, it is judged whether the music information transmitted from the music server 20 is obtained by the output terminal 1. Step S110 is repeated until the music information is received. Is the music information is received, step S111 is performed.

At step S111, the music information obtained at step S110 is temporarily stored in the storage area 83.

At step 112, the second motion list information is generated. For each motion information of the first motion list information stored in the storage area 85 shown in FIG. 13, a desired music is selected by the user. The user selects the desired music information from plural pieces of music information stored in the storage area 83. The music information selected by the use is assigned to each motion information as shown in FIG. 13. The second motion list information to which the music information is assigned by the user as shown in FIG. 14 is temporarily stored in the storage area 86.

At step S113, it is judged whether setting of assigning music information to each motion information at step S112 is completed or not. If the setting is not completed, step S112 is performed again. If the setting is completed, step S114 is performed. In the first embodiment, when the user designates a setting completion button displayed on the display 4 using the information inputting portion 5, it is judged that the setting is completed.

At step S114, the second motion list information generated at step S112 and stored in the storage area 86 is transmitted to the music server 20 through the network connecting portion 9. The music server 20 temporarily stores the received second motion list information in the storage area 231 of the music server.

At step S115, the music performance information corresponding to the music information of the second motion list information transmitted at step S114 is transmitted to the output terminal 1 from the music server 20. Then, it is judged whether the output terminal 1 receives the transmitted music performance information or not. Step S115 is repeated until the music performance information is received. If the music performance information is received, step S116 is performed. By comparing the music performance information corresponding to the music information of the second motion list information stored in the storage area 86 with the music performance information received by the output terminal 1 and stored in the storage area 84, it is judged whether the music performance information is received or not.

At step S116, the music performance information obtained at the step S115 is temporarily stored in the storage area 84.

At step S117, according to the second motion list information, the motion video information stored in the storage area 82 provided in the output terminal 1 is output by the display 4. According to the second motion list information, the music performance information stored in the storage memory 84 provided in the output terminal 1 is output by the speakers 2 and 3. The second motion list information is stored in the storage memory 86. In the first embodiment, the motion video information is sequentially output from the motion video information corresponding to the motion information while motion number is small. The motion video corresponding to each motion information is output by the display 4 in the order of "squat, knee up, back lunge, and front lunge" of the second motion list information shown in FIG. 14. The motion video information is output by the display 4 based on the motion tempo corresponding to each motion information. Number of still images (shown in FIG. 8) stored in the storage memory 82 is determined based on the motion tempo at which each motion information is performed. For example, if the motion tempo is "100", all 16 still images shown in FIG. 8 are displayed on the display 33. If the motion tempo is "50" smaller than "100", the interval of outputting the still images by the display 4 is long as compared in the case of motion tempo "100". Therefore, if the 16 still images are simply output with the motion tempo "50", the interval of the output still images becomes long. As a result, smooth video cannot be displayed. Therefore, new still images which respectively interpolate between a still image "1" and a still image "2" and between the still image "2" and a still image "3", etc. Then, the number of the still images to be displayed on the display 4 becomes 31. The smooth video can be output by generating the interpolating images and determining the number of still images to be displayed on the display 4 in response to the motion tempo. On the other hand, instead of generating the interpolating images, still images showing actions between the still image "1" and a still image "2" and between the still image "2" and the still image "3", etc. may be stored in advance.

If the motion tempo is "200" larger than "100", the interval of outputting the still images by the display 4 is short as compared in the case of motion tempo "100". As a result, all 16 still images is displayed with the tempo "200", the display of 16 still images cannot follow the speed of the tempo "200". Thus, smooth video may not be displayed. Thus, while 16 still images are output in the case of the motion tempo "100", 8 still images of "1", "3", "5", "7", "9", "11", "13" and "15" are output. When the display 4 displays the motion video information, a value of music tempo of the music performance information to be output is changed to the value of the motion tempo, and then the music performance information is output by the speakers 2 and 3. The motion video information corresponding to each motion information is displayed by the display 4 and the music performance information corresponding to the motion information is output from the speakers 2 and 3 in response to the motion tempo at which the motion is performed. For example, if the motion video information corresponding to the motion information "back lunge" is output by the display 4, the motion tempo at which the motion information "back lunge" is performed is "90". Thus, "cc performance.midi" corresponding to the music information "cc" is output from the speakers 2 and 3 with tempo "90".

At step S118, it is determined whether the power switch is turned off by the user. If the power switch is not turned off by the user, step S102 is performed again. If the power switch is turned off by the user, the process is returned to S101 and S101 is performed again.

(Explanation of Operation of Generating First Motion List)

Figure 16:
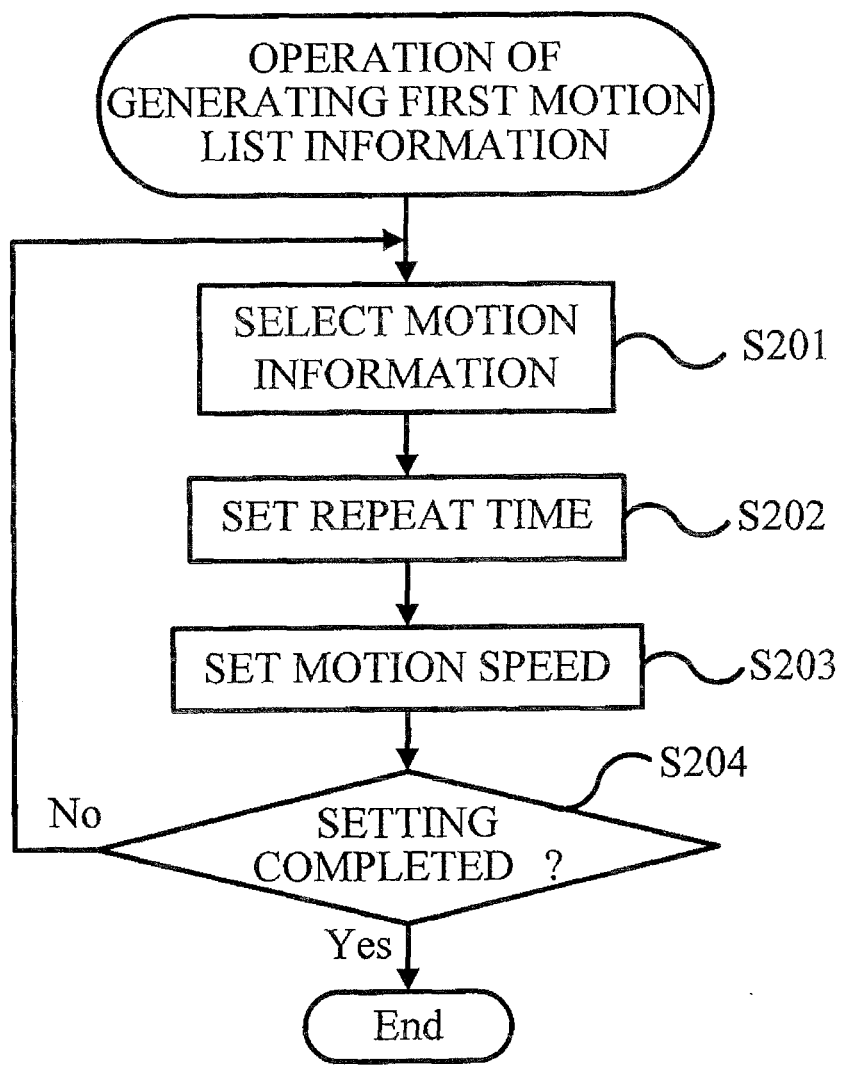
FIG. 16 is a flowchart carrying out first motion list information generation process of the output terminal 1 according to a first motion list information generation process program 12 according to the first embodiment.

As shown in FIG. 16, at step S201, the user selects desired motion information. The user select the desired motion information from plural pieces of motion information stored in the storage memory 81, which are displayed on the display 4. At this time, the motion information displayed on the display 4 is motion information stored in the storage area 81. In the first embodiment, as shown in FIG. 13, "squat", "knee up", "back lunge" and "front lunge" are selected as the motion information from the plural pieces of motion information.

At step S202, the user sets a desired repeat time for the motion information selected at step S201. Specifically, the user selects the desired repeat time using the information inputting portion 5 from repeat times displayed on the display 4. A value of the repeat time may be directly input using the information inputting portion 5. In the first embodiment, as shown in FIG. 13, as the repeat time, 8 times for "squat", 6 times for "knee up", 12 times for "back lunge" and 12 times for "front lunge" are set.

At step S203, the motion tempo at which the motion designated by the motion information is performed is set for the motion information selected at step S201. The user selects a desired motion tempo using the information inputting portion 5 from the motion tempos displayed on the display 4. A value of the motion tempo may be directly input using the information inputting portion 5. In the first embodiment, as shown in FIG. 13, tempo 120 for "squat", tempo 80 for "knee up", tempo 90 for "back lunge" and tempo 90 for "front lunge" are set as motion tempo information. At step S204, it is judged whether various settings set at the operation of generating the first motion list information is completed or not. If it is judged that the setting is not completed, step S201 is repeated again. If it is judged that the setting is completed, the operation of generating the first motion list is ended. In the first embodiment, when the user designate the setting completion button displayed on the display 4 using the information inputting portion 5, it is judged that the setting is completed.

<Explanation of Operation of Motion Server 10 According First Embodiment>

Figure 17:
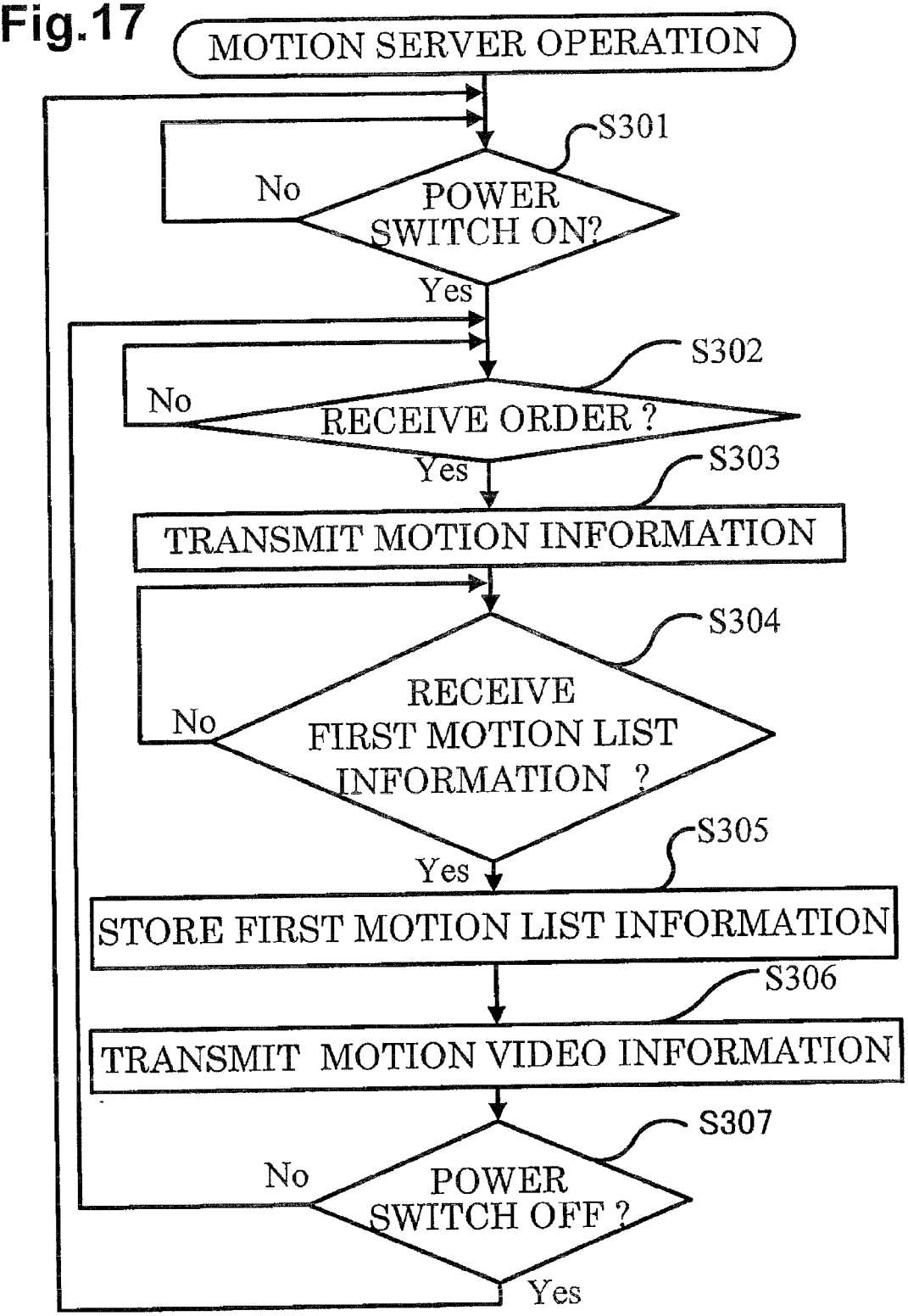
FIG. 17 is a flowchart showing a process of an operation in the motion server 10 of the contents generation system according to the first embodiment.

An operation and effect of the motion server 10 according to the first embodiment will be described with reference to the drawings. The motion server 10 shown in FIG. 17 is connected to an external power source such as commercial power source through an outlet and the CPU 11 of the motion server 10 executes the motion server operation program. By executing the motion server operation program, the operation of the motion server is performed. The CPU 11 performs the following process.

First, at step S301, it is judged whether a power switch of the motion server 10 is turned on by a user. The step S301 is repeated until it is judged that the power switch is turned on. If the power switch is turned on, step S302 is performed. The power switch can be a hardware switch or a power switch implemented by a software.

At step S302, it is judged whether a motion information obtaining order transmitted from the output terminal 1 is received by the motion server 10. If the order is not received, step S304 is performed. If the order is received, step S303 is performed.

At step S303, the motion information stored in the storage area 121 provided in the motion server 10 is transmitted to the output terminal 1 through the network connecting portion 14.

At step S304, it is judged whether the first motion list information transmitted from the output terminal 1 is received by the motion server 10. If it is not received, step S307 is performed. If it is received, S305 is performed.

At step S305, the first motion list information received at step S304 is temporarily stored in the storage area 131 provided in the motion server 10.

At step S306, the motion video information corresponding to the motion information of the first motion list information received at step S304 is read out from the storage area 122 and transmitted to the output terminal 1.

At step S307, it is judged whether the power switch is turned off by the user. If the power switch is not turned off, step S302 is performed again. If the power switch is turned off, the process is returned to step S301 and the step S301 is performed again.

<Explanation of Operation of Music Server 20 According to First Embodiment>

Figure 18:
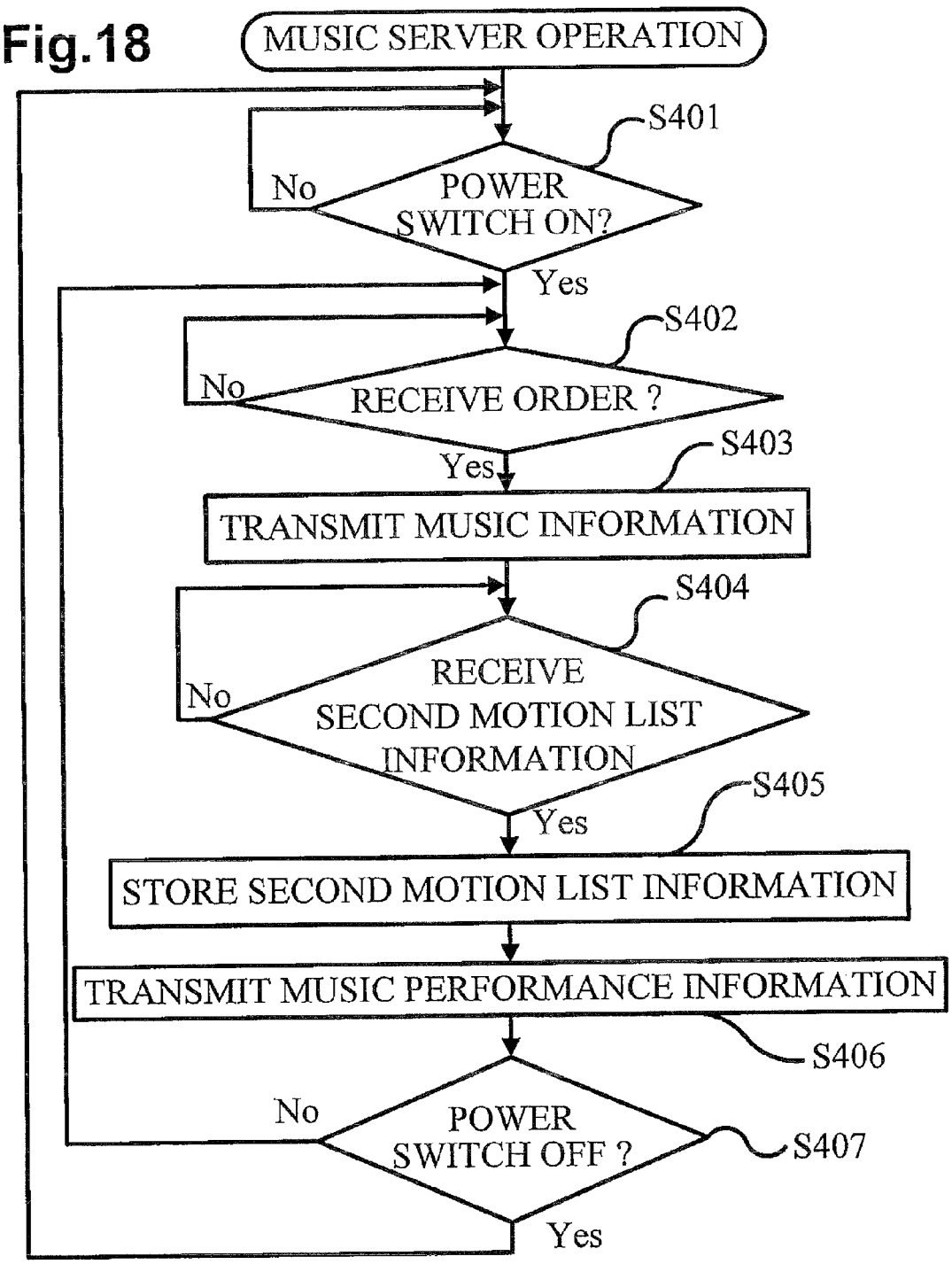
FIG. 18 is a flowchart showing a process of an operation in the music server 20 of the contents generation system 100 according to the first embodiment.

An operation and effect of the music server 20 according to the first embodiment will be described with reference to the drawings. The music server 20 shown in FIG. 18 is connected to an external power source such as commercial power source through an outlet and the CPU 21 of the motion server 20 executes the music server operation program. By executing the music server operation program, the operation of the music server is performed. The CPU 21 performs the following process.

First, at step S401, it is judged whether a power switch of the music server 20 is turned on by a user. The step S401 is repeated until it is judged that the power switch is turned on. If the power switch is turned on, step S402 is performed. The power switch can be a hardware switch or a power switch implemented by a software.

At step S402, it is judged whether a music information obtaining order transmitted from the output terminal 1 is received by the music server 20 or not. If it is not received, step S404 is performed. If it is received, step S403 is performed.

At step S403, the music information stored in the storage area 221 is transmitted to the output terminal 1 through the network connecting portion 24.

At step S404, it is judged whether the second motion list information transmitted from the output terminal 1 is received by the music server 20 or not. If it is not received, step S407 is performed. If it is received, step S405 is performed.

At step S405, the second motion list information received at step S404 is temporarily stored in the storage area 231 provided in the music server 20.

At step S406, the music performance information corresponding to the music information of the second motion list information received at step S404 is read out from the storage area 222 and transmitted to the output terminal 1.

At step S407, it is judged whether the power switch is turned off by the user. If the power switch is not turned off, step S402 is performed again. If the power switch is turned off, the process is returned to step S401 and the step S401 is performed again.

Second Embodiment

The contents generation system according to a second embodiment will be described with reference to the drawings. Since the configuration and the outside structure of contents generation system according to the second embodiment is the same as that of the first embodiment, the description thereof is omitted and the different part will be described below.

<Electrical Configuration of Output Terminal 1 According to Second Embodiment>

Figure 19:
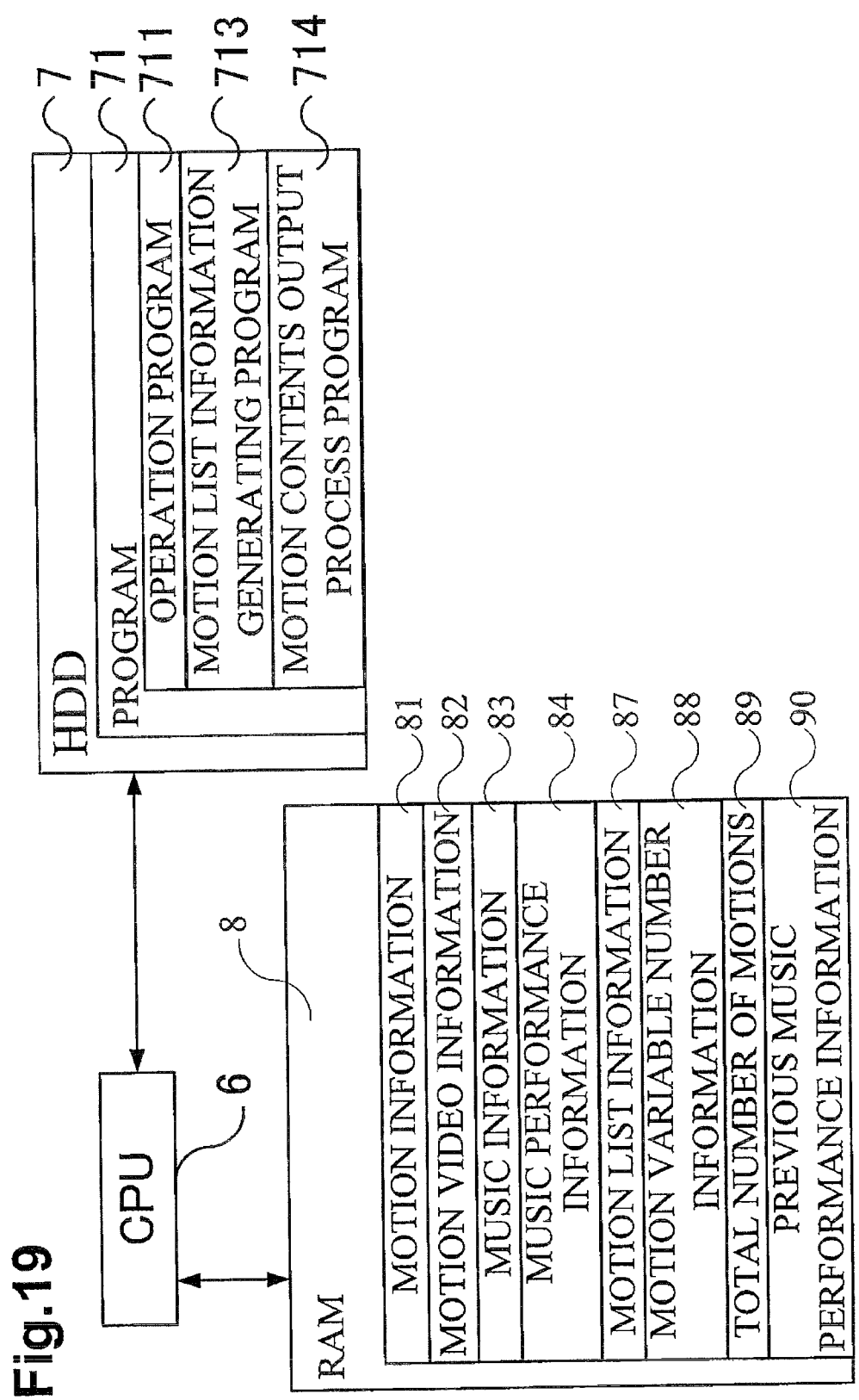
FIG. 19 is a block diagram showing an electrical configuration of the output terminal 1 in the contents generation system according to a second embodiment.

A HDD 7 provided in the output terminal 1 as shown in FIG. 19 has a program information storage area 71 which includes a storage area 713 for motion list generation process program information and a storage area 714 for motion content output process program information. The storage area 713 stores the motion list generation process program information. The motion list generation process program information is a program for generating motion list information. The storage area 714 stores the motion contents output process program information. The motion contents output process program is a program for outputting the motion video information and music performance information to the output terminal 1 according to the motion list information.

A RAM 8 provided in the output terminal 1 has a storage area 87 for temporarily storing motion list information, a storage area 88 for temporarily storing motion variable number information, a storage area 89 for temporarily storing total number of motions, and a storage area 80 for temporarily storing previous music performance. The storage area 87 stores the motion list information generated by the motion list generation process program. In the same manner as in the first embodiment, as shown in FIG. 20, the motion list information includes information about the motion number, the motion tempo as motion speed, the repeat time, the motion information and the music information. In the second embodiment, "Continue" "Null" as music information as shown in FIG. 10 is assigned to the motion information. "Continue" means that the music performance information output previously from the speakers 2 and 3 is to be output. "Null" means that no music performance information is output. The storage area 88 temporarily stores the motion number corresponding to the motion information to be output from the output terminal 1. The storage area 89 temporarily stores the total number of the motion information to be output from the output terminal 1. The storage area 80 temporarily stores the music performance information previously output from the output terminal 1.

The electrical configuration of the motion server 10 is almost the same as the electrical configuration shown in FIG. 3. As a different point from FIG. 3, the RAM 13 provided in the motion server 10 has a first storage area 132 for motion list information. The first storage area 132 temporarily stores the motion list information stored in the storage area 87 of the RAM provided in the output terminal 1. The motion server 10 obtains the motion list information stored in the storage area 87 from the output terminal 1 through the network connecting portion 14.

The electrical configuration of the music server is almost the same as the electrical configuration shown in FIG. 9. As a different point from FIG. 9, the RAM 23 provided in the music server 20 has a second storage area 232 for motion list information. The second storage area 232 temporarily stores the motion list information stored in the storage area 87 of the RAM provided in the output terminal 1. The music server 20 obtains the motion list information stored in the storage area 87 from the output terminal 1 through the network connecting portion 24.

The operation and effect of the contents generation system 100 will be described with reference to the drawings. First, the operation and effect of the output terminal 1 will be described with reference to the drawings. The output terminal is connected to an external power source such as commercial power source through an outlet and the CPU 6 of the output terminal executes the output terminal operation program as shown in FIG. 21A, FIG. 21B and FIG. 21C. By executing the output terminal operation program, the operation of the output terminal is performed. The CPU 6 performs the following process. Step S501 to step S504 of the operation of the output terminal according to the second embodiment are the same as the step S101 to step S104 of the operation of the output terminal according to the first embodiment. Step S505 to step S507 of the operation of the output terminal according to the second embodiment are the same as the step S109 to step S111 of the operation of the output terminal according to the first embodiment.

At step S508, a process of generating motion list information is performed. At Step S508, the motion list information is generated based on the motion information obtained at the step S504 and the music information obtained at the step S507. The generated motion list information is temporarily stored in the storage area 87.

At step S509, it is judged whether the generation of the motion list information generated at step S508 is completed or not. If the generation is not completed, step S508 is performed again. If the generation is completed, step S510 is performed.

At step S510, the motion list information generated at step S508 is transmitted from the output terminal 1 to the motion server 10 through the network connecting portion 9. The motion list information stored in the storage area 87 provided in the output terminal 1 is transmitted from the output terminal 1 to the motion server 10. The motion server 10 temporarily stores the received motion list information in the first storage area 132.

At step S511, it is judged whether the motion video information corresponding to the motion information of the motion list information transmitted from the output terminal 1 to the motion server 10 at step S510 is received by the output terminal 1 or not. Step S511 is repeated until the motion video information is received. If the motion video information is received, step S512 is performed. By comparing the motion video information of the motion list information stored in the storage area 87 with the motion vide information received by the output terminal 1 and stored in the storage area 82 received, it is judged whether the motion video information is received or not.

At step S512, the motion video information received at step S511 is temporarily stored in the storage area 82 provide in the output terminal 1.

At step S513, the motion list information generated at step S508 is transmitted from the output terminal 1 to the music server 20 through the network connecting portion 9. The motion list information stored in the storage area 87 provided in the output terminal 1 is transmitted to the music server 20. The music server 20 temporarily stores the received motion list information in the second storage area 232.

At step S514, it is judged whether the music performance information is transmitted from the music server 20 and is received by the output terminal 1 or not. The music performance information transmitted from the music server 20 is the music performance information corresponding to the music information of the motion list information transmitted from the output terminal 1 at step S513. Step S514 is repeated until the music performance information is received. If the music performance information is received, step S515 is performed. By comparing the music performance information corresponding to the music information of the motion list information stored in the storage area 87 with the music performance information received by the output terminal 1 and stored in the storage area 84, it is judged whether the music performance information is received.

At step S515, the music performance information obtained at step S514 is temporarily stored in the storage area 84.

At step 516, the process of outputting the motion contents is performed. The motion video information is output by the display 4 according to the motion list information stored in the storage area 87. The motion video information output by the display 4 is the motion video information stored in the storage area 82 provided in the output terminal 1. The music performance information is output by the speakers 2 and 3 according to the motion list information stored in the storage area 87. The music performance information output by the speakers 2 and 3 is the music performance information store in the storage area 84 provided in the output terminal 1.

At step S517, it is judged whether the power switch is turned off by the user. If the power switch is not turned off, step S502 is performed again. If the power switch is turned off, the process is returned to step S501 and the step S501 is performed again.

<Explanation of Operation of Generating Motion List Information>

Step S601 to step S603 of the motion list generating process according to the second embodiment as shown in FIG. 22 is the same as the S201 to step S203 of the first motion list generating process according to the first embodiment.

At step S604, a desired music is selected by the user for each motion information of the motion list information generated at step S601, and thereby the motion list information as shown in FIG. 20 is generated. The user selects the desired music information from plural pieces of the music information stored in the storage area 83. At step S604, "Continue" and "Null" instead of music information stored in the storage area 83 can be assigned for the motion information. The selected music information is assigned to each motion information as shown in FIG. 20. The motion list information to which the music information is assigned is temporarily stored in to storage area 87. At step S605, it is judged whether various settings for setting the operation of generating the motion list information are completed or not. If the settings are not completed, step S601 is performed again. If the settings are completed, the operation of generating the motion list information is ended. In the second embodiment, when the user designate a setting completion button displayed on the display 4 using the information inputting portion 5, it is judged that the setting is completed.

(Explanation of Motion Contents Output Process)

As shown in FIG. 23A and FIG. 23B, at step S701, initial values are stored in the storage area 88 for the motion variable number information and the storage area 89 for temporarily storing the total number of motion information. "1" is temporarily stored as the initial value in the storage area 88. The total number "4" of the motion information of the motion list information stored in the storage area 87 is temporarily stored as the initial value in the storage area 89.

At step S702, "Null" is temporarily stored in the storage area 80.

At step S703, the motion information and the music information corresponding to the motion variable number stored in the storage area 88 is obtained from the storage area 87. For example, if "1" is stored in the storage area 88, the motion information "squat" corresponding to the motion number "1" as shown in FIG. 14 is obtained, and the music information "TT" corresponding to the motion number "1" is obtained.

At step S704, it is judged whether the music information corresponding to the motion information obtained at step S703 is "Continue" or not. If the music information is "continue", step S705 is performed. If the music information is not "continue", step S707 is performed.

At step S705, it is judged whether "Null" is stored in the storage area 80 for temporarily storing the previous music performance information or not. If "Null" is stored, step S708 is performed. If "Null" is not stored, step S706 is performed.

At step S706, the music performance information stored in the storage area 80 is output by the speakers 2 and 3. The motion video information corresponding to the motion information obtained at step S703 is output by the display 4. For example, if the motion video information and the music performance information corresponding to the motion number "2" is output after the motion video information and the music performance information corresponding to the motion number "1" as shown in FIG. 20 is output, the music information corresponding to the motion number "2" is "Continue". The music performance information corresponding to the music information "TT" of the music information number "1" as shown in FIG. 20 is stored in the storage area 80. Therefore, when the motion information "knee up" corresponding to the motion number "2" is performed, the music performance information "TT performance.midi" stored in the storage area 80 is output by the speakers 2 and 3. The music previously output and stored in the storage area 80 may be continuously reproduced. On the other hand, the music previously output and stored in the storage area 80 may be reproduced again from the beginning.

At step S707, it is judged whether the music information corresponding to the motion information obtained at step S703 is "Null" or not. If the music information is "Null", step S708 is performed. If the music information is not "Null", step S709 is performed.

At step S708, the music performance information is not output by the speakers 2 and 3. The motion video information corresponding to the motion information obtained at step S703 is output by the display 4.

At step S709, the motion video information corresponding to the motion information obtained at step S703 is output by the display 4. The music performance information corresponding to the motion information obtained at step S703 is output by the speakers 2 and 3. The music performance information specified by the music information obtained at step S703 is temporarily stored in the storage area 80.

At step S710, it is judged whether the output of the motion video information obtained at step S703 is completed or not. If it is completed, step S711 is performed. If it is not completed, step S712 is performed.

At step S711, the output of the music performance information by the speakers 2 and 3 is stopped.

At step S712, it is judged whether the output of the music performance information specified by the music information obtained at step S703 is completed or not. If it is completed, step S713 is performed. If it is not completed, step S710 is performed again.

At step S713, the music performance information stored in the storage area 80 is repeatedly output by the speakers 2 and 3. The music previously output and stored in the storage area 80 is repeatedly output.

At step S714, it is judged whether a value stored in the storage area 88 is less than the value stored in the storage area 89 or not. If the value stored in the storage area 88 is less than the value stored in the storage area 89, step S715 is performed. If the value stored in the storage area 88 is not less than the value stored in the storage area 89, the process of outputting the motion contents is ended.

At step S715, the value stored in the storage memory 88 is incremented by one and stored in the storage memory 88 again.

The operation and effect of the motion server 10 according to the second embodiment is almost the same as the flowchart shown in FIG. 17. The different point is that at step S304, it is judged whether the motion list information transmitted from the output terminal 1 is received by the motion server 10 or not. The step S304 is repeated until the motion list information is received. If the motion list information is received, step S305 is performed. At step S305, the motion list information received at step S304 is temporarily stored in the first storage area 132 provided in the motion server 10. At step S306, the motion video information corresponding to the motion information of the motion list information received at step S304 is read out from the storage area 122. The read-out motion video information is transmitted to the output terminal 1.

The operation and effect of the music server 20 according to the second embodiment is almost the same as the flowchart shown in FIG. 18. The different point is that at step S404, it is judged whether the motion list information transmitted from the output terminal 1 is received by the music server 20. Step S404 is repeated until the motion list information is received. If the motion list information is received, step S405 is performed. At step 405, the motion list information received at step S404 is temporarily stored in the second storage area 232 provided in the music server 20. At step S406, the music performance information corresponding to the music information of the motion list information received at step S404 is read out from the storage area 222, and then the read-out music performance information is transmitted to the output terminal 1.

First Modification

A first modification of the first and second embodiments will be described. In the first modification, the contents generation system 100 may includes a motion list generation device for generating the motion list and a contents output device which is separated from the motion list generation device. The motion list generation device includes a program storage area 71 of the HDD, the RAM 8 having the storage area 81 for temporarily storing motion information and the storage area 83 for temporarily storing music information, the CPU and the network connecting portion according to the first or second embodiment. The contents output device includes the RAM 8 having the storage area 82 for temporary storing motion video information, the storage area 84 for temporarily storing the music performance information and the storage area for temporarily storing the second motion list information, the CPU, and the network connecting portion. The motion list generation device and the contents output device are connected together by each network connecting device through the Internet. The contents output device obtains the second motion list information and the motion list information generated by the motion list generation device from the motion list generation device. The contents output device obtains the motion video information and the music performance information from the motion server or the music server of the first or second embodiment. The contents output device outputs the obtained motion video information by the display and outputs the obtained music performance information by the speaker.

Second Modification

A second modification of the first and second embodiments will be described. In the second modification, the output terminal may be provided with the HDD 12 and the RAM 13 provided in the motion server of the first and second embodiments, and the HDD 22 and the RAM 23 provided in the music server of the first and second embodiments. The output terminal may not obtain the motion information, the motion video information, the music information and the music performance information through the Internet, and the motion information, the motion video information, the music information and the music performance information may be stored in the HDD provided in the output terminal. In this case, it is not necessary to provide the motion server and the music server. The output terminal may be provided only with the HDD 12 and the RAM 13 provided in the motion server of the first and second embodiment. In this case, the motion information and the motion video information are stored in the HDD provided in the output terminal. The output terminal may be provided only with the HDD 22 and the RAM 13 provided in the motion server of the first and second embodiment. In this case, the music information and the music performance information are stored in the HDD provided in the output terminal.

Third Modification

A third modification of the first and second embodiments will be described. In the third modification, a motion list server which stores the first motion list information, the second motion list information or the motion list information may be provided in the contents generation system. The output terminal may obtain the first motion list information, the second motion list information or the motion list information from the motion list server. The motion server and the music server transmits, to the output terminal, the motion video information and the music performance information according to the first motion list information, the second motion list information or the motion list information obtained by the output terminal. The first motion list information, the second motion list information or the motion list information stored in the motion list server may be directly transmitted to the motion server or the music server without through the output terminal. The motion server and the music server transmits to the output terminal the motion video information and the music performance information according to the received first motion list information, the second motion list information or the motion list information. The first motion list information, the second motion list information and the motion list information which are generated by the different plural output terminals may be stored in the motion list server.

Fourth Modification

A fourth modification of the step S112 of the process of operating the output terminal of the first embodiment and the step S604 of the process of generating the motion list information of the second embodiment is described. In the fourth modification, one piece of music may not correlate to one piece of motion information. As shown in FIG. 24, one piece of music "TT" is assigned to three pieces of motion information "squat", "knee up" and "back lunge". In this case, the one piece of music "TT" is repeatedly output until the motion designated by the three pieces of motion information is completed.

Fifth Modification

A fifth modification of the step S112 of the process of operating the output terminal of the first embodiment and the step S604 of the process of generating the motion list information of the second embodiment is described. In the fifth modification, plural pieces of music information may be assigned to one piece of motion information. In this case, when output of one piece of the music performance information among plural pieces of music performance information corresponding to the motion information is completed, the music performance information different from the music performance information having being reproduced may be output.

Sixth Modification

A sixth modification of the step S112 of the process of operating the output terminal of the first embodiment and the step S604 of the process of generating the motion list information of the second embodiment is described. In the sixth modification, music may be automatically assigned to the motion information of the first motion list information. User's favorite information, recommended music of a distribution service may be used to automatically assign the music to the motion information of the first motion list information. If the number of pieces of motion information of the first motion list information is not matched with the number of pieces of music, the music information may be automatically assigned to each motion information.

Seventh Modification

A seventh modification of the motion server 10 and the music server 20 of the first and second embodiments will be described. In the seventh modification, plural music servers and music servers may be provided in the contents generation system 100. By transmitting the first motion list information of the first embodiment or the motion list information of the second embodiment to the plural motion servers from the output terminal 1, the user can obtain the desired motion information and the motion video information corresponding to the motion information from the plural motion servers. Further, by transmitting the first motion list information of the first embodiment or the motion list information of the second embodiment to the plural music servers from the output terminal 1, the user can obtain the desired music information and the music performance information corresponding to the music information from the plural music servers.

Eighth Modification

An eighth modification of the process of generating the first motion list information of the first embodiment and the process of generating the motion list information of the second embodiment will be described. In the eighth embodiment, the motion tempo may be set automatically instead of inputting the motion tempo by the user. For example, by inputting private information of user, the motion tempo for each motion information may be automatically set based on the private information. Further, the value of the motion tempo may be manually input.

Ninth Modification

A ninth modification of the process of generating the first motion list information of the first embodiment and the process of generating the motion list information of the second embodiment will be described. In the ninth modification, the process may not be performed in order from the step S201 to the step S203 of the process of generating the first motion list information. Further, the process may not be performed in order from the step S601 to step S604 of the process of generating the motion list information. The process from step S201 to step S203 may be repeated and the process from step S601 to step S603 may be repeated so that the motion information and the motion tempo and the repeat time by which the motion information is performed is selected for each piece of the motion information.

Tenth Modification

A tenth modification of the storage memory 122 for motion video information of the first and second embodiments will be described below. In the tenth modification, an video may be prepared by actually taking moving pictures of a body doing the motion, and the prepared video information may be stored in the storage 122. In the first and second embodiments, a three dimensional image showing a predetermined action by plural coordinate positions is stored in the storage area 122, however a two dimensional image may be stored. In the tenth modification, the reproducing speed at which the actually taken video is reproduced by the display 4 is changed according to the set motion tempo or motion speed. Reproducing speed becomes faster as the motion tempo becomes high.

Eleventh Modification

An eleventh modification of the first and second embodiments will be described below. In the eleventh modification, right before the motion information is output, the output terminal 1 may obtain the motion video information and the music performance information according to the second motion list information or the motion list information. By obtaining the motion video information and the music performance information right before the motion information is output, if the reproducing of the motion according to the motion information of the second motion list information or the motion list information is cancel in midstream, the excess motion video information and excess music performance information which would not be reproduced would not be obtained.

Twelfth Modification

A twelfth modification of the first and second embodiments will be described below. In the twelfth modification, the repeat time may not be set at step S22 of the process of generating the first motion list information according to the first embodiment and the step S602 of the process of generating the motion list information according to the second embodiment.

Thirteenth Modification

A thirteenth modification of the first and second embodiments will be described. In the thirteenth modification, the first motion list information or the motion list information are not transmitted to the motion server 10, and all motion video information stored in the storage area 122 of the motion server 10 may be transmitted to the output terminal 1. A part of the motion video information stored in the storage area 122 of the motion server 10 may be transmitted to the output terminal 1. In this case, the motion video information which is not stored in the storage area 82 of the output terminal 1 is transmitted to the output terminal 1 from the motion server 10.

Fourteenth Modification

A fourteenth modification of the first and second embodiments will be described below. In the fourteenth modification, the first motion list information or the motion list information are not transmitted to the music server 20, and all music performance information stored in the storage area 222 of the music server 20 may be transmitted to the output terminal 1. A part of the music performance information stored in the storage area 222 of the music server 20 may be transmitted to the output terminal 1. In this case, the music performance information which is not stored in the storage area 82 of the output terminal 1 is transmitted to the output terminal 1 from the music server 20.

Fifteenth Modification

A fifteenth modification of the first and second embodiments will be described below. In the fifteenth modification, a type of motion may be defined by the motion information of the first and second embodiments and a rhythm with which the motion of the motion information is performed. For example, "Squat rhythm A" "Squat rhythm B" which are defined by the motion information "squat", and plural rhythms may be stored in the storage 121 as the motion information defining the type of the motion.

Sixteenth Modification

A sixteenth modification of the first and second embodiments will be described below. In the sixteenth modification, the output terminal may directly obtain the motion video information from the motion video information storage area provided in the motion server based on the first motion list information or the motion list information.

Seventeenth Modification

A seventeenth modification of the first and second embodiments will be described below. In the seventeenth modification, the output terminal may directly obtain the music performance information from the music performance information storage area provided in the music server based on the first motion list information or the motion list information.

What is claimed is:
1. An information processing apparatus comprising:
a processor comprising hardware configured to execute the steps of:
  obtaining plurality types of motion information representing a plurality of types of motion from one of a motion server and a memory of the information processing apparatus;
  obtaining motion video information including a video corresponding to the motion information from the motion server or the memory of the information processing apparatus;
  setting motion speed at which motion of the motion information included in the motion list is performed;
  generating a first motion list which includes the plural types of motion information and the respective set motion speed corresponding to each other;
  obtaining plural types of music information from one of a music server and the memory of the information processing apparatus;
  selecting music information from the plural types of music information corresponding to the motion information which are included in the first motion list and displayed on a display;
  generating a second motion list which includes the plural types of motion information, the respective set motion speed in the first motion list, and the selected music information, which are correlated to each other;
  obtaining music performance information having a specific music speed from the music server or the memory of the information processing apparatus, the music performance information corresponding to the music information in the second motion list;

a video controller configured to output to display the motion video information corresponding to the motion information in the second motion list according to the motion speed in the second motion list; and a music controller configured to output to a speaker the obtained music performance information corresponding to the music information in the second motion list, the music performance information being output at the music speed corresponding to the motion speed set for the motion information, the music controller being configured to change the music speed of the music performance information from the specific music speed to the music speed in the second motion list in response to outputting the motion video information by the video controller.

2. The information processing apparatus according to claim 1, wherein the processor further executes judging whether the music information corresponding to the motion information to be output by the video controller is set in the second motion list or not, in response to judging that the music information corresponding to the motion information to be output by the video controller is not set in the second motion list, the music controller outputs the music which was previously output.

3. The information processing apparatus according to claim 1, wherein the processor further executes judging whether or not the video controller completes outputting the motion video information corresponding to the motion information, wherein when the video controller outputs the motion video information corresponding to the motion information according to the second motion list, the music controller stops outputting the music in response to judging that the video controller completes outputting the motion video information.

4. The information processing apparatus according to claim 3, wherein when the music controller completes outputting the music, the music controller repeatedly outputs the music in response to judging that the video controller does not complete outputting the motion video information.

5. The information processing apparatus according to claim 1, wherein the processor further executes setting a repeat time of how many times the motion of the motion information in the first motion list is performed, wherein the video controller repeats outputting the motion video information corresponding to the repeat time set in the first motion list.

6. The information processing apparatus according to claim 1, wherein the processor further executes storing plural types of the motion information through a network, storing plural types of the motion video information through the network, and storing the music performance information through the network.

7. A contents generating method comprising:

obtaining motion information representing plural types of motion;

obtaining motion video information including a video corresponding to the obtained motion information included in the motion list;

setting motion speed at which motion of the motion information performed;

generating a first motion list which includes the plurality types of motion information and the respective set motion speed corresponding to each other;

obtaining plural types of music information;

selecting music information from the plural types of music information corresponding to the motion information which are included in the first motion list and displayed on a display;

generating a second motion list which includes the plural types of motion information, the respective set motion speed in the first motion list, and the selected music information, which are correlated to each other;

obtaining music performance information having a first music speed, the music performance information corresponding to the music information in the second motion list;

outputting the motion video information corresponding to the motion information in the second motion list according to the set motion speed; and outputting the obtained music performance information correspond to the music information in the second motion list, the music performance information being output at a second music speed corresponding to the motion speed set for the motion information, the music speed of the output performance information being changed from the first music to the second music speed in response to outputting the motion video information.

8. A non-transitory computer readable recording medium storing a program causing a computer to perform:

obtaining motion information representing plural types of motion;

obtaining motion video information including a video corresponding to the obtained motion information included in the motion list;

setting motion speed at which motion of the motion information performed;

generating a first motion list which includes the plural types of motion information and the respective set motion speed corresponding to each other;

obtaining plural types of music information;

selecting music information from the plural types of music information corresponding to the motion information which are included in the first motion list and displayed on a display;

generating a second motion list which includes the plural types of motion information, the respective set motion speed in the first motion list, and the selected music information, which are correlated to each other;

obtaining music performance information having a first music speed, the music performance information corresponding to the music information in the second motion list;

outputting the motion video information corresponding to the motion information in the motion list according to the set motion speed; and outputting the obtained music performance information corresponding to the music information in the second motion list, the music performance information being output at a second music speed corresponding to the motion speed set for the motion information, the music speed of the output performance information being changed from the first music to the second music speed in response to outputting the motion video information.

* * * * *